(12) United States Patent
Marino et al.

(10) Patent No.: US 12,008,030 B2
(45) Date of Patent: *Jun. 11, 2024

(54) SYSTEM AND METHOD FOR AUTOMATIC SYNCHRONIZATION OF VIDEO WITH MUSIC, AND GAMING APPLICATIONS RELATED THERETO

(71) Applicant: Soundtrack Game LLC, Oxford, MS (US)

(72) Inventors: John Bo Marino, Oxford, MS (US); Jeffrey Lloyd Holmes, Oxford, MS (US)

(73) Assignee: Soundtrack Game LLC, Oxford, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/100,462

(22) Filed: Jan. 23, 2023

(65) Prior Publication Data
US 2023/0161803 A1  May 25, 2023

Related U.S. Application Data

(63) Continuation of application No. 17/169,148, filed on Feb. 5, 2021, now Pat. No. 11,593,422, which is a (Continued)

(51) Int. Cl.
*H04N 21/242* (2011.01)
*G06F 16/432* (2019.01)
(Continued)

(52) U.S. Cl.
CPC .......... *G06F 16/433* (2019.01); *G06F 16/438* (2019.01); *G06F 16/483* (2019.01); (Continued)

(58) Field of Classification Search
None
See application file for complete search history.

(56) References Cited

U.S. PATENT DOCUMENTS

| 7,716,572 B2 | 5/2010 | Beauregard | G11B 27/005 386/281 |
| 7,793,208 B2 | 9/2010 | Iampietro | G11B 27/28 715/203 |

(Continued)

FOREIGN PATENT DOCUMENTS

| EP | 1734505 A1 | 12/2006 | G10H 1/368 |
| WO | WO-0175646 A1 | 10/2001 | G06F 16/954 |
| WO | WO-2007029916 A1 | 3/2007 | H04N 21/235 |

*Primary Examiner* — Brian T Pendleton
*Assistant Examiner* — Jean D Saint Cyr
(74) *Attorney, Agent, or Firm* — Dentons US LLP

(57) ABSTRACT

A computer system including a server having a processor and a memory, the memory having a video database and a music database, the video database storing at least one video file having a plurality of video file markers, and the music database storing at least one music file having a plurality of music file markers, wherein the server receives and decodes encoded data from computer readable code, identifies and retrieves from the music database a music file based on the decoded data, synchronizes the retrieved music file with one of the video files by aligning the video file markers of the video file with the music file markers for the retrieved music file to produce a synchronized video-music file, and transmits the synchronized video-music file to a display, wherein the video file markers are generated for each video file and the music file markers are generated for each music file.

6 Claims, 28 Drawing Sheets

Related U.S. Application Data continuation of application No. 16/290,522, filed on Mar. 1, 2019, now Pat. No. 10,915,566.

(51) Int. Cl.

| | |
|---|---|
| *G06F 16/438* | (2019.01) |
| *G06F 16/483* | (2019.01) |
| *G06K 7/14* | (2006.01) |
| *H04N 21/43* | (2011.01) |
| *H04N 21/4545* | (2011.01) |
| *H04N 21/81* | (2011.01) |
| *H04N 21/845* | (2011.01) |
| *H04N 21/8547* | (2011.01) |
| *H04N 21/8549* | (2011.01) |

(52) U.S. Cl.
CPC ....... *G06K 7/1417* (2013.01); *H04N 21/4307* (2013.01); *H04N 21/816* (2013.01); *H04N 21/8456* (2013.01); *H04N 21/8549* (2013.01)

(56) References Cited

U.S. PATENT DOCUMENTS

| | | | | |
|---|---|---|---|---|
| 9,838,730 | B1 | 12/2017 | Matias | G11B 27/005 |
| 10,284,809 | B1 | 5/2019 | Noel | G11B 27/10 |
| 2002/0007354 | A1* | 1/2002 | Deguchi | H04N 21/8113 |
| | | | | 348/E7.071 |
| 2002/0042834 | A1 | 4/2002 | Kremens | H04L 65/605 |
| | | | | 709/231 |
| 2003/0045956 | A1* | 3/2003 | Comair | A63F 13/45 |
| | | | | 381/61 |
| 2003/0160944 | A1 | 8/2003 | Foote | G11B 27/36 |
| | | | | 352/1 |
| 2003/0164845 | A1 | 9/2003 | Fayan | G11B 27/031 |
| | | | | 715/722 |
| 2004/0027396 | A1 | 2/2004 | Lection | G06F 3/04847 |
| | | | | 715/863 |
| 2004/0085341 | A1 | 5/2004 | Hua | G11B 27/28 |
| | | | | 715/723 |
| 2005/0123886 | A1 | 6/2005 | Hua | G10H 1/361 |
| | | | | 434/307 A |
| 2005/0211072 | A1 | 9/2005 | Lu | G10H 1/40 |
| | | | | 84/612 |
| 2007/0261537 | A1 | 11/2007 | Eronen | G10H 1/40 |
| | | | | 84/611 |
| 2007/0292106 | A1 | 12/2007 | Finkelstein | G11B 27/28 |
| | | | | 386/241 |
| 2009/0249222 | A1* | 10/2009 | Schmidt | H04N 21/4143 |
| | | | | 713/400 |
| 2012/0227078 | A1 | 9/2012 | Ljolje | |
| 2015/0380053 | A1 | 12/2015 | Gordon | G11B 27/34 |
| | | | | 386/282 |
| 2016/0044343 | A1* | 2/2016 | Bost | H04N 21/23424 |
| | | | | 725/32 |
| 2017/0064154 | A1 | 3/2017 | Tseng et al. | |
| 2017/0287456 | A1 | 10/2017 | Zund et al. | |
| 2018/0053379 | A1 | 2/2018 | Meyer | G07F 17/34 |
| 2018/0076913 | A1 | 3/2018 | Kiely et al. | |
| 2018/0286458 | A1 | 10/2018 | Harron | G06F 16/7834 |
| 2019/0080719 | A1 | 3/2019 | Patry | H04N 5/76 |

\* cited by examiner

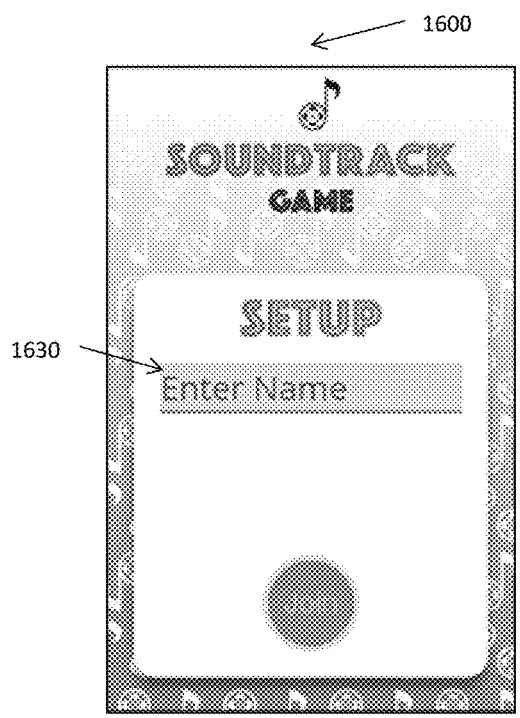 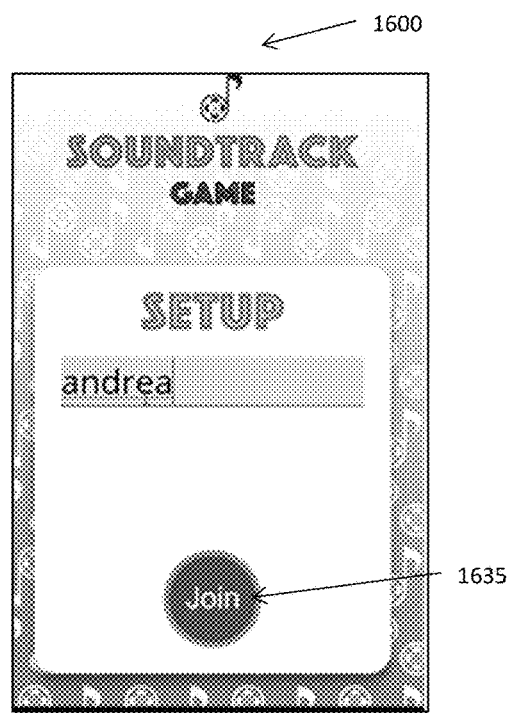
FIG. 16(e)  FIG. 16(f)

SYSTEM AND METHOD FOR AUTOMATIC SYNCHRONIZATION OF VIDEO WITH MUSIC, AND GAMING APPLICATIONS RELATED THERETO

This application is a Continuation of U.S. patent application Ser. No. 17/169,148, filed on Feb. 5, 2021, which is a Continuation of U.S. patent application Ser. No. 16/290,522, filed on Mar. 1, 2019, now U.S. Pat. No. 10,915,566.

TECHNICAL FIELD

This application relates to synchronizing video streams with music streams based on key moments, graphical user interfaces, and more particularly, to systems and methods for gaming and other applications employing such technology.

BACKGROUND

The present disclosure provides a computer-aided technique for real-time synchronization of video with music that provides a more efficient and time saving approach over prior art synchronization methods. Conventional synchronization methods require extensive manual input and are more error prone, thereby reducing overall efficiency and scalability, as well as increasing the amount of time required to generate synchronized media (e.g., video, music, etc.). For the aforementioned reasons, there is a need for a synchronization system and method thereof that alleviates the problems faced by the conventional synchronization methods. However, such technologies do not exist. Accordingly, this disclosure enables such technologies.

SUMMARY

To achieve the foregoing objects, and in accordance with the purpose of the invention as embodied and broadly described herein, there is provided a computer system including a server having a processor and a memory, the memory including a video database and a music database, the video database configured to store a plurality of video files, each of the video files having a plurality of video file markers, and the music database configured to store a plurality of music files, each of the music files having a plurality of music file markers, wherein the server is configured to: receive encoded data from computer readable code; decode the received encoded data; identify a music file associated with the decoded data, retrieve the identified music file from the music database; synchronize the retrieved music file with one of the plurality of video files by aligning the video file markers of the video file with the music file markers for the retrieved music file to produce a synchronized video-music file; and transmit the synchronized video-music file to a display to be displayed, wherein the video file markers are generated for each of the video files stored in the video database and the music file markers are generated for each of the music files stored in the music database.

According to an embodiment of the invention, the server may receive the encoded data from a card recognition device. The card recognition device may be a laptop computer, a desktop computer, a smartphone, a tablet, or a wearable device, and the server may be configured to receive the encoded data from the card recognition device via a wireless network.

According to an embodiment of the invention, the computer readable code may be disposed or printed on a physical playing card. The computer readable code may include a bar code or a Quick Response (QR) Code.

According to an embodiment of the invention, the video file markers may include at least one of a video start time marker, a video fade time marker, a video end time marker, a video volume envelope marker, a music volume envelope marker, a video music start time marker, and a video key frame moment marker. The music file markers may include at least one of a music file start time marker and a music file key sound moment marker.

According to an embodiment of the invention, each of the video files may include at least a portion of a movie, video, or a graphical offering, and each of the music files may include at least a portion of a song or an audio offering.

According to an embodiment of the invention, the video file markers may include a video file start time marker in the video file that identifies a time point at which the video file will begin playing during playback of the synchronized video-music file; a video file end time marker in the video file that identifies a time point at which the video file ends during playback of the synchronized video-music file; a video file volume envelope in the video file that controls audio volume of the video file is adjusted during playback of the synchronized video-music file; a music volume envelope in the video file that controls music volume of the retrieved music file to be synchronized with the video file; at least one video/music start time marker in the video file that identifies a time point at which the music file will begin playing during playback of the synchronized video-music file, each video/music start time marker having a priority component and a time component assigned thereto relative to a video timeline of the video file; and at least one video key frame moment in the video file that identifies a key video portion of the video file, each video key frame moment having a priority component and a time component assigned thereto relative to the video timeline.

According to an embodiment of the invention, the music file markers may include at least one music start time marker in the music file that identifies a time point at which the music file will begin playing during playback of the synchronized video-music file, each music time start marker having a priority component and a time component assigned thereto relative to a music timeline of the music file; and at least one music key sound moment in the music file that identifies a key sound portion of the music file, each music key sound moment having a priority component and a time component assigned thereto relative to the music timeline.

According to an embodiment of the invention, the computer system of claim 10, wherein during the synchronization process, to determine an optimal alignment of the video file markers and the music file markers, the server may be configured to determine whether any combination of the at least one video/music start time marker and the at least one music start time marker results in an alignment of any of the at least one video key frame moment with any of the at least one music key sound moment within a predetermined threshold of time of the video timeline; and pair any of the video/music start time markers and the music start time markers that are determined to be in alignment and if more than one pair of the video/music start time markers and the music start time markers are determined to be in alignment, then the pair with the highest priority is determined to be the video/music start time marker and the music start time marker used in the synchronized video-music file.

According to an embodiment of the invention, are server may be configured to detect audio changes in the music file in order to generate the at least one music key sound moment, hereby such detection is determined by parameterizing the music file and then evaluating the parameterized music file to detect changes from frame to frame.

According to an embodiment of the invention, the predetermined threshold of time may be 0.10 seconds, 0.11 seconds, or 0.05 seconds.

According to an embodiment of the invention, there is a method that includes receiving, by a server, encoded data from computer readable code; decoding, by the server, the received encoded data; identifying, by the server, a music file associated with the decoded data, retrieving, by the server, the identified music file from a music database; synchronizing, by the server, the retrieved music file with one of the plurality of video files by aligning at least one video file marker of the video file with at least one music file markers for the retrieved music file to produce a synchronized video-music file; and transmitting, by the server, the synchronized video-music file to a display to be displayed, wherein the video file markers are generated for each of the video files stored in the video database and the music file markers are generated for each of the music files stored in the music database, and wherein the server includes a processor and a memory, the memory including a video database and a music database, the video database configured to store a plurality of video files, each of the video files having a plurality of video file markers, and the music database configured to store a plurality of sic files, each of the music files having a plurality of music file markers.

According to an embodiment of the invention, there is a server including a processor and a memory the memory including a video database and a music database, the video database configured to store a plurality of video files, each of the video files including a plurality of video file markers, and the music database configured to store a plurality of music files, each of the music files including a plurality of music file markers, and one or more end user electronic devices in communication with the server; wherein the server is configured to: generate a graphical user interface (GUI) to be displayed on an end user electronic device, the GUI including a plurality of music selection elements; transmit the GUI to the end user electronic device; receive from the end user electronic device a selected music selection element from the plurality of music selection elements, the selected music selection element being selected by a user; transmit one or more music selection options receive a music selection from each of the one or more end user electronic devices; identify a music file associated with the selected music selection element; retrieve the identified music file from the music database; synchronize the retrieved music file with a video file from the video database by aligning the video file markers of the video file with the music file markers for the retrieved music file to produce a synchronized video-music file; and transmit the synchronized video-music file to a display to be displayed, wherein the video file markers are generated for each of the video files stored in the video database and the music file markers are generated for each of the music files stored in the music database.

According to an embodiment of the invention, the is a computer system including a server including a processor and a memory, the memory including a video database and a music database, the video database storing at least one video file, each of the at least one video file having a plurality of video file markers, and the music database storing at least one music file, each of the at least one music file having a plurality of music file markers, wherein the server: receives encoded data from computer readable code; decodes the received encoded data; identifies a music file associated with the decoded data, retrieves the identified music file from the music database; synchronizes the retrieved music file with one of the at least one video files by aligning the video file markers of the one of the at least one video files with the music file markers for the retrieved music file to produce a synchronized video-music file; and transmits the synchronized video-music file to a display to be displayed, wherein the video file markers are generated for each of the video files stored in the video database and the music file markers are generated for each of the music files stored in the music database.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the present disclosure and together with the specification, explain the present disclosure.

DETAILED DESCRIPTION OF THE PREFERRED EMBODIMENTS

Figure 1:
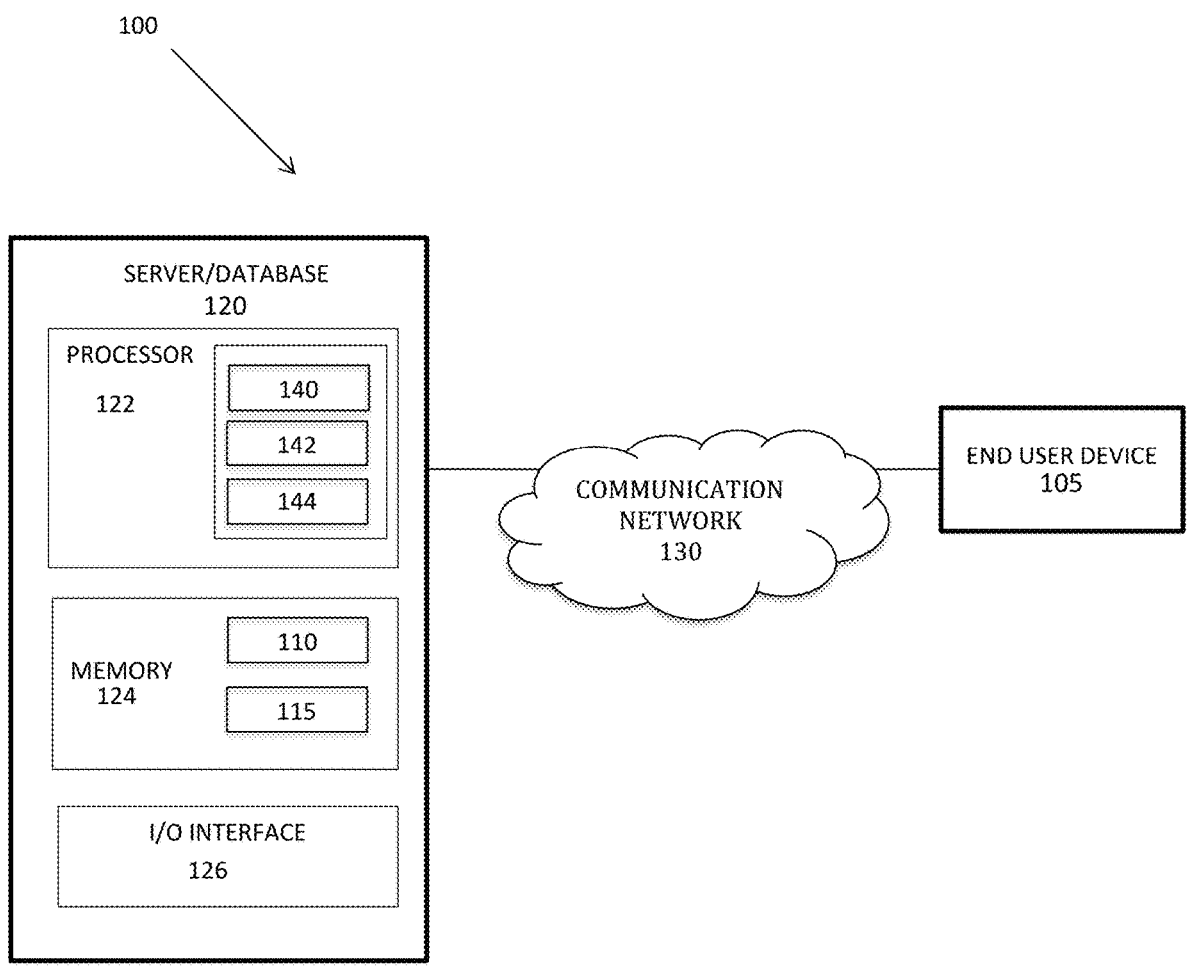
FIG. 1 shows a block diagram of an embodiment of the present disclosure.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be added in subsequent filings along with figures, but they are not required to understand the present disclosure. The inventors assert and exercise their right to their own lexicography. Quoted terms are defined explicitly, but quotation marks are not used when a term is defined implicitly. Terms may be defined, either explicitly or implicitly, here in the Detailed Description of the Preferred Embodiments and/or elsewhere in the application file.

As used herein, a "computer system" may include, for example, one or more servers, motherboards, processing nodes, personal computers (portable or not), personal digital assistants, smartphones, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many examples run on workstation or laptop computers, other examples may run on other computing devices, and any one or more such devices may be part of a given example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to prevent a mistaken conclusion that a given chip has at most one processor; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Code" means processor instructions, data (which includes constants, variables, and data structures), or both instructions and data.

"Program" is used broadly herein, to include applications, kernels, drivers, interrupt handlers, libraries, and other code written by programmers (who are also referred to as developers).

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense).

"Automatically" or "automatic" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately." "Computationally" and "automatically" are used interchangeably herein.

Throughout this document, use of the optional plural "(s)," "(es)," or "(ies)" means that one or more of the indicated feature is present. For example, "processor(s)" means "one or more processors" or equivalently "at least one processor."

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest with regard to a destination or other subject may involve intervening action such as forwarding, copying, uploading, downloading, encoding, decoding, compressing, decompressing, encrypting, decrypting, authenticating, invoking, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. Unless expressly stated otherwise in a claim, a claim does not cover a signal per se. For the purposes of patent protection in the United States, a memory or other computer-readable storage medium is not a propagating signal or a carrier wave outside the scope of patentable subject matter under the United States Patent and Trademark Office (USPTO) interpretation of statutory subject matter.

Various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, features described with respect to certain embodiments may be combined in or with various other embodiments in any permutational or combinatory manner. Different aspects or elements of example embodiments, as disclosed herein, may be combined in a similar manner.

The term "combination," "combinatory," or "combinations thereof" as used herein refers to all permutations and combinations of listed items preceding that term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. A skilled artisan will understand that typically there is no limit on a number of items or terms in any combination, unless otherwise apparent from the context.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

As used herein, the term "about" and/or "substantially" refers to a +/−10% variation from the nominal value/term, unless otherwise stated.

Words such as "then," "next," etc. are not intended to limit the order of the steps; these words are simply used to guide the reader through the description of the methods.

Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

FIGS. 1-10 show an exemplary embodiment of a method and system for real-time (or near real-time) computer-aided synchronization processing of video files with music files. The method and system utilize a set of rules that automatically determine a set of key frames in the video and the music files that are then synchronized.

As discussed below, for every video file or video stream, the synchronization process may involve: (1) generating a video volume envelope to control the video's own audio volume; (2) generating a music volume envelope to control the music volume of any music stream to be synchronized with the video stream; (3) generating potential starting points which determine a time for a music stream to begin playing relative to the video stream; and (4) generating event markers that are marked as key frames for use in aligning music files. For every music file or music stream, the synchronization process may involve: (1) generating markers that identify important changes in the music that are marked as key frames for use in aligning with video files or video streams; and (2) generating potential starting points which determine when the music begins playing with respect to the music stream itself. All key frames and starting points generated for the video and music files are assigned a priority value which indicates their relative importance. During the synchronization process, all potential starting points for the music (both relative to the video and the music files themselves) may be evaluated. The optimal starting point for synchronizing the video and music files may then be determined by maximizing the product of the importance of the key frames and starting points.

FIG. 1 shows a schematic view of an exemplary embodiment of a computer system 100 for video/music synchronization. The computer system 100 is software-enabled and may comprise one or more server/database 120, one or more networks 130, and one or more end user devices 105. The various components of the computer system 100 may be coupled directly or indirectly, whether in a wired or wireless manner.

The user device 105 may communicate various types of data and instructions to and from devices of the computer system 100, such as the server(s) 120 via the network(s) 130. The user device 105 may be any computing device comprising hardware and software components capable of performing various tasks and processes described herein. Non-limiting examples of the user device 105 may include: laptop computers, desktop computers, smartphones, tablets, wearable devices (e.g., smart watches, smart glasses, AR headsets, VR headsets, etc.), and the like. Any communication protocol may be utilized by the user devices 105 for communication. For example, a communications component of the user device 105 may include a wireless NIC allowing the user device(s) 105 to communicate data and instructions with servers 120 and/or other devices within the computer system 100, over one or more networks 130, using Wi-Fi, TCP/IP, and other, related protocols.

The user device 105 may run applications, such as gaming applications, and the like, that execute communication of data and/or instructions to devices of computer system 100. The data may be related to video and music files to be synchronized by the server 120. For example, during a gaming application running on the user device 105, data such as video and/or music files may be communicated, via network(s) 130, to server 120, as input for video-music synchronization. In response, the user device 105 may receive synchronized video-music files corresponding to the communicated video files, where the received synchronized video/music files may be played back by the applications running on the user device 105.

The server 120 may provide services for synchronization, storing, processing, and communicating data and instructions between devices of the computer system 100, such as the user device 105. Such services may be cloud based. The server 120 may include a processor 122, a memory 124 that stores a video database 112 and a music database 115, and/or an I/O interface 126.

The processor 122 can include a single core or a multicore processor. The processor 122 can include a system-on-chip (SOC) or an application-specific-integrated-circuit (ASIC).

The memory 124 can include a read-only-memory (ROM), a random-access-memory (RAM), a hard disk drive, a flash memory, or others. The memory 124 stores a set of instructions executable via the processor 122, wherein the set of instructions instructs the processor to take an action.

The server 120 may be configured to operate as a distributed database, such as by utilizing one or more additional databases and/or servers to process data and/or computer instructions. The processor 122 may be configured to perform the video/music synchronization technique (discussed below), and may include a video processing module 140, a music processing module 142, and a synchronization processing module 144. Each of the processing modules, 140, 142, and 144 may be integrated into a single processing module or may be separate processing modules.

The video database 112 may store a plurality of video files (e.g., movies or movie streams) containing data fields associated with those videos. The video files may contain video data in a video coding format alongside audio data in an audio coding format. The container format can also contain synchronization information, subtitles, and metadata such as title. For example, such video file formats may include: AVI (Audio Video Interleave), FLV (Flash Video Format), WMV (Windows Media Video), MOV (Apple QuickTime Movie), MP4 (Moving Pictures Expert Group 4), etc.

The music database 115 may store a plurality of music files in a digital format containing data fields associated with those music files. The music files may be a compressed or non-compressed format. For example, such music file formats may include: Waveform Audio (.wav), MPEG-1 Audio Layer 3 (.mp3), Windows Media Audio (.wma), Ogg Vorbis (.ogg); etc. Other digital audio formats may be easily adapted to the present invention.

The video processing module 140 may be configured to perform processing of the video files stored in the video database 112. As discussed in more detail below, such processing may include generating markers (with associated priorities, when applicable) for video files stored in video database 112. These makers may include video start times, video fade times, video end times, video volume envelopes, music volume envelopes, video music start times, and video key frame moments.

The music processing module 142 may be configured to perform processing of the music files stored in the music database 115. As discussed in more detail below, such processing may include generating markers (with associated priorities, when applicable) for music files stored in the music database 115. These markers may include music stream start times and music key sound moments.

The synchronization processing module 144 may be configured to perform synchronization of the music files with the video files. As discussed in more detail below, such processing is preferably performed based on a key frame matching algorithm.

In some configurations, the synchronization processing module 144 may execute one or more computer models to synchronize the music files with different video files. The one or more computer models may include neural networks arranged and configured in accordance with a dataset representing historical key frame matching data. For instance, the synchronization processing module 144 may generate an artificial intelligent (AI) model to codify key frame matching algorithm. When training the AI model, the synchronization processing module 144 may generate a training dataset comprising historical data, such as previous key frames matched with different video files. The synchronization processing module 144 may then train (e.g., arrange or configure) the neural network accordingly. While generating the neural network, the synchronization processing module 144 may feed known and historical data (e.g., training data set) to the AI model where the AI model uses machine learning techniques to allocate different attributes of the key matching algorithm to different nodes (e.g., fit the curve).

In some configurations, the synchronization processing module 144 may use various techniques to train the neural network and to adapt to various data points and improve the neural network's efficiency and accuracy. For instance, the synchronization processing module 144 may use a supervised machine learning method to train the neural network. Supervised learning is the machine-learning task of learning a function that maps an input to an output based on example input-output pairs. A supervised learning algorithm analyzes the training data and produces an inferred function, which can be used for mapping new examples. In some embodiments, the synchronization processing module 144 may use a linear regression model-to-model cyber-attack actions and responses. This technique is a linear approach to modelling the relationship between a scalar response (dependent variable) and one or more explanatory variables (independent variables). In linear regression modeling, the relationships are modeled using linear predictor functions whose unknown model parameters are estimated from the data.

The synchronization processing module 144 may also use a boosting tree regression technique to match music and video files. Gradient boosting is a machine-learning technique for regression and classification problems, which produces a prediction model in the form of decision trees. For instance, the synchronization processing module 144 may build binary trees by partitioning the data into two samples at each split node where each node represents a data point corresponding to key frame matching protocol/algorithm. Using the tree (e.g., traversing the tree) the synchronization processing module 144 may match music files with video files.

The servers 120 hosting the processing modules 140, 142, and 144 may be any computing devices comprising a processor 122 and non-transitory machine-readable storage media allowing the databases to perform the various tasks and processes described herein. In some embodiments, the processor 122 and/or video and music databases 110 and 115 may be hosted on the same device or on distinct devices. In addition, in some embodiments, the processor 122 and/or video and music databases 110 and 115 may be hosted on the user device.

The servers 120 may comprise a network server, an application server, and a database server. The network server may serve content, such as a network page, a data stream, or a data feed. For example, the network server can serve content to an application server in response receiving a corresponding request. For example, the network server can push to or pull content from the application server. The network server can serve content, such as a network page, via pushing or pulling, to the user device 105, the administrator terminal, over a LAN in response receiving a corresponding request. Such service can be via a protocol, such as via HTTP or a hypertext transfer protocol secure (HTTPS). For example, the network page can be file-based and can be static or dynamic. For example, the network page can be dynamically generated and can be markup language based, such as via a Hypertext Transfer Markup Language (HTML). For example, the network server can comprise a web server, such as Apache, Microsoft® Internet Information Server (IIS), Novell's NetWare server, or Google Web Server (GWS).

The application server may host a software application and a set of business logic for the software application, such as a file comprising a spreadsheet or a worksheet. Therefore, as instructed by the software application, the application server can communicably interface with the network server (e.g., through a firewall) and the database server. For example, the application server can act as a middle-tier server, with the network server acting as front-tier server, and the database server acting as a back-end server. The application server may comprise a plurality of independent processing units, which are the units that read and execute program instructions.

The database server may host a database and a database management system. The application hosted on the application server can communicably interface with the database server in order to request various database operations, as disclosed herein, such as files stored in the video database 112 and music database 115. The database server stores data, whether in a raw state, a formatted state, an organized stated, or any other accessible state, and allows access to such data, whether directly and/or indirectly. The database can be a single database or a plurality of databases, whether hosted on a single machine or a plurality of machines, whether in a single data center or distributed among a plurality of data centers.

The computer system 100 may be programmed to run an application on an operating system (OS), such as Windows, Linux, Android, MacOS, and/or others. The application is programmed to display a graphical user interface (GUI), as disclosed herein. The GUI may be programmed to display an output and receive an input.

For example, the server 120 may be configured to generate different graphical user interfaces and display them on different computing devices described herein, such as a display and/or end user devices 105. For example, the server 120 hosting the databases may comprise a processor and non-transitory machine-readable storage media comprising a set of instructions allowing the various databases to perform various tasks and processes described herein, such as to display various graphical user interfaces. Each instruction within the set of instructions may command and cause a different module of the server 120 or processors to display a particular section or container of the graphical user interfaces described below. For example, a first instruction may instruct (e.g., command or cause) a first module of the server 120 to query pertinent data from a database of the memory 124, such as a video database 110, a music database 115, and display a first section of a graphical user interface; and a second instruction may instruct a second module of the server 120 to query pertinent data from a different database and display a second section of the graphical user interface. Although described herein as separate modules, it is intended that these modules can be configured as at least one module. Moreover, the server 120 may be a database server comprising a processor capable of performing the various tasks and processes described herein. The server 120 may host an online service, such as cloud-computing application service, or any other service that provide web-based applications that collect data through web-based client interactions over one or more networks such as network 130. Accordingly, the server 120 may generate and display different graphical user interfaces on different computing devices described herein.

According to another embodiment, for example, the one or more servers 120 include an analytics engine that further includes a data extraction module and data processing module. The analytics engine can be a software component stored on a computer readable medium and executed by a processor, e.g., as specially-programmed software on a server (referred to and used interchangeably as an analytics engine server). The analytics engine can be configured to receive user input from one or more end user devices 105, receive data from a database (e.g., video database 110, music database 115, etc.), produce solution data from the received user input and data, and provide the produced solution data to one or more end user devices 105 and/or display.

In some embodiments, the analytics engine may be implemented as a set of computer instructions executed by one or more servers 120 that run computer executable program instructions or related algorithms.

Note that any of the servers 120 disclosed herein can be hardware-based and/or software-based. Each of the servers 120 is and/or is hosted on, whether directly and/or indirectly, a server computer, whether stationary or mobile. The server computer can comprise another computer system and/or a cloud computing network. The server computer can run any type of an OS, such as MacOS, Windows, Android, Unix, Linux, and/or others. The server computer can include and/or be coupled to, whether directly and/or indirectly, an input device, such as a mouse, a keyboard, a touchscreen, a biometric reader, a clicker, a microphone, or any other suitable input device. The server computer can include and/or be coupled to, whether directly and/or indirectly, an output device, such as a display, a speaker, or any other suitable output device. In some embodiments, the input device and the output device can be embodied in one unit, such as a touch-enabled display. Each of the servers can be task-dedicated. At least two of the servers can be a single server.

The embodiments of the present disclosure provide a method for a computer-aided real-time synchronization of video and music media using some or all of components of the exemplary computer system 100. More specifically, the method includes processing video and music media to generate one or more markers which are utilized to compute and determine an optimal and/or preferred alignment of video and music media for synchronization.

Exemplary Video Processing Technique:

FIGS. 2-6 show an embodiment of a video processing operation for generating video markers for a video stream according to the present disclosure. The video processing operation preferably comprises a set of computer executable rules so that each video stream 200 in a video database 112 may undergo the same processing operation by the server 120. Video stream 200 may be one or more predetermined portions of video extracted from a video file, or the entire video file itself. For example, video stream 200 may be a 30 second video portion extracted from a 90 minute movie. Video stream 200 is not limited to any particular type of media, duration, or content. Video stream 200 may be stored in a video database 112 that is stored on and executable by a processor of the server 120 and/or user device 105.

Figure 2:
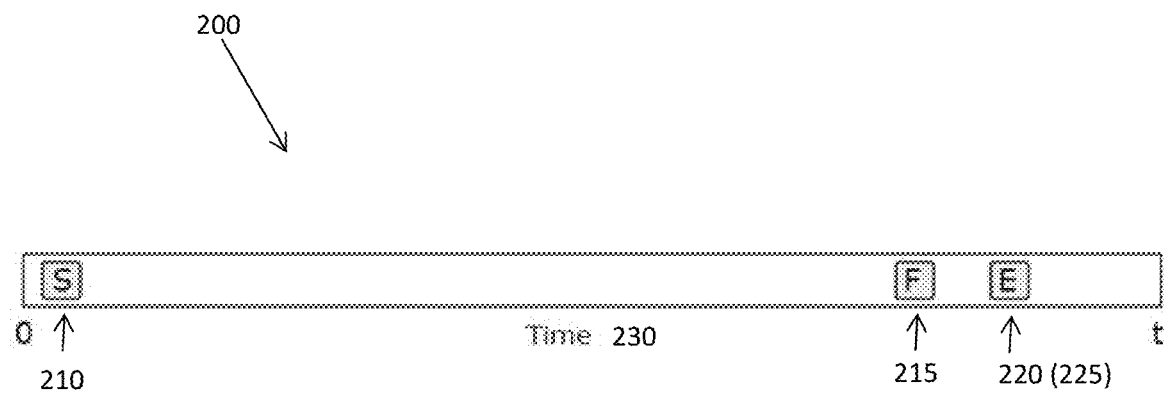
FIG. 2 shows video start time, video fade time, and video end time markers generated for a video stream, according to an embodiment of the present disclosure.

As shown in FIG. 2, the exemplary video processing technique involves generating by the server 120 one or more video stream time markers 210, 215, and 220 for a video stream 200 (e.g., video clip or digitized video file). The video stream time markers can be inserted into one or more video streams. The video stream time markers and video stream may be encoded. Encoded video time markers and encoded music markers (discussed below) can be inserted at corresponding locations in video streams and music streams (e.g., sync locations or sync points), such as locations with corresponding timestamps (e.g., with the same or nearly the same timestamp). Such technique may involve generating a start time marker 210, a fade time marker 215, a visual end time marker 220, and an audio end time marker 225 for a video timeline (T) of video stream 200 (not limited to those specific marker points—may include more, less, or different markers).

The video stream start time marker 210 may mark or identify a time point at which video stream 200 will begin playing during playback of the synchronized video/music (e.g., the video stream 200 synchronized with music, discussed in more detail below). The video stream visual end time marker 220 may mark or identify a time point at which video stream 200 ends during playback of the synchronized video/music. The video stream audio end time marker 225 may mark or identify a time point at which audio of the video stream 200 ends during playback of the synchronized video-audio. The video stream fade time marker 215 may mark or identify a time point at which the video image of video stream 200 begins fading, e.g., a time when the video image begins fading to black. It is understood that the visual and audio end time markers 220, 225 of video stream 200 may mark or identify the same time point at which to stop the video and audio, or different time points (e.g., audio may stop before the end of the visual).

The video stream 200 has a duration (0 to t) indicated by video timeline (T). The video start time marker 210 may be set at any predetermined time within the video timeline (T) and does not have to be the actual starting point (e.g., time 0) of the video timeline (T). For example, if the video stream 200 is a 30 second video stream (t=30 seconds), the video stream start time marker 210 may be set at a 5 second time point from t=0. In this situation, during playback of video stream 200, playback will begin at the 5 second mark of video stream 200 and the total duration of playback will be 25 seconds.

The video stream fade time marker 215 may be set at any predetermined time subsequent to the video stream start time marker 210. During playback of the synchronized video-audio, the video image of video stream 200 will begin fading at the video stream fade time marker 215 and continue to fade until the video stream end time marker 220 when the video stops playing. At the video stream end time marker 220, the volume of video stream 200 may be stopped and the video image may disappear and/or turn to black or almost black. The fading may have a predetermined level of decay. The video stream audio may end before the end of the visual, which is handled with volume envelopes (discussed below).

The video stream end time marker 220 does not have to be the last time point of the video timeline (T). For example, if the video stream 200 is a 30 second video stream, the video stream end time marker 220 may be set at the 20 second time point. Hence, in this example, during playback, the video stream 200 will end at the 20 second mark.

The video start time marker 210, fade time marker 215 (optional), and end time marker(s) 220 (225) of video stream 200 may be generated for every video stream 200 stored in the video database 112. These markers define the period of time which will define the playback duration of the synchronized video-audio (described below). Along with the video start time marker 210, fade time marker 215, and video end time marker 220 markers, video volume time markers may be generated for video stream 200, such as shown in FIG. 3.

Figure 3:
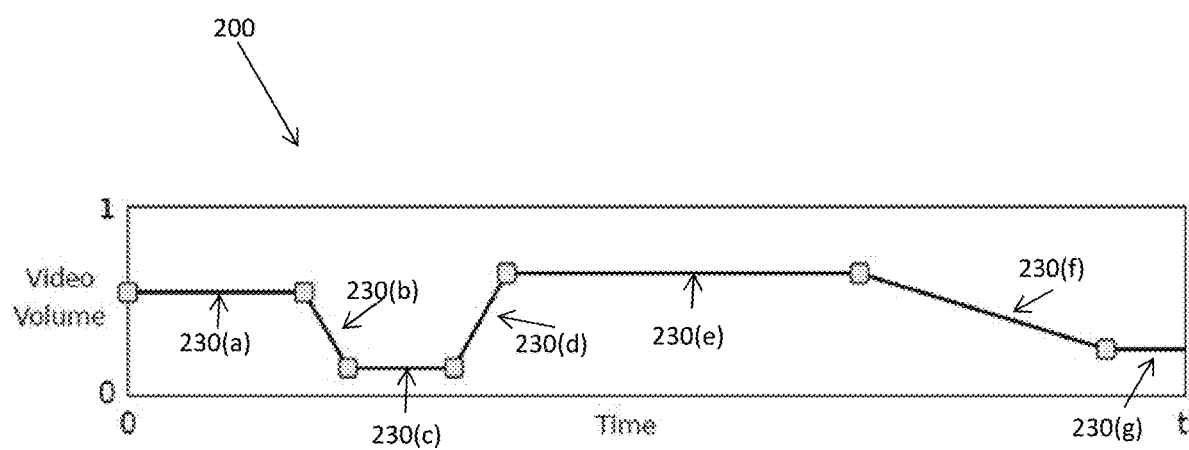
FIG. 3 shows a video volume envelope generated for a video stream according to an embodiment of the present disclosure.

As shown in FIG. 3, the exemplary video processing technique further involves generating by the server 120 a video volume envelope (VVE) for every video stream 200, which is referred to as generating video volume instructions. The VVE defines how and/or when the volume of video stream 200 is adjusted during playback of the synchronized video-music. That is, the VVE sets video volume of video stream 200 with respect to the video timeline (T) during playback of the synchronized video-music. Note that the video volume here refers to the video stream itself and not the volume of a music stream (e.g., music or any audio) to be synchronized with the video. The video volume may pertain to dialog within video stream 200 and/or any other sound associated with video stream 200.

The VVE may include one or more time segments having varying volume levels, respectively. For example, as shown in FIG. 3, the video stream 200 may be marked with time segments 230a, 230b, 230c, 230d, 230e, 230f, and 230g. Each time segment within the VVE may have a different video volume level (VVL) (e.g., ranging from a minimum level 0 to a maximum level 1) with respect to timeline T of video stream 200. The VVE may begin with any predetermined level of video volume and may include any predetermined levels of video volume variations with respect to the video timeline (T). Generally, the video volume remains relatively constant during time portions of the video stream 200 that do not contain more than a predetermined level of sound (or just contain dialog). In the example, during playback of the synchronized video-audio, the VVL of video 200 will be adjusted according to time segments 230(a)-230(g).

For example, beginning with time segment 230a, the VVL is about midrange and is kept at a constant level until time segment 230b. At time segment 230b, the VVL is steadily decreased. In other words, during playback of video stream 200, the video volume will be adjusted to have a steady decrease for the time portion corresponding to segment 230b. Generally, near video key frame moments, it is preferable for the video volume to be lowered, such as shown in time segment 230b while the volume of an audio stream, which has been synchronized with a video stream (described later), is increased. Time segment 230c begins at an end point of time segment 230b and the VVL within time segment 230c is kept constant. Time segment 230d begins at an end point of time segment 230c and the VVL within this segment is steadily increased. Time segment 230d indicates that, during playback of video stream 200, the volume of the video will have a steady increase relative to the time portion corresponding to segment 230d. Time segment 230e begins at an end point of time segment 230d and the VVL within this time segment is kept constant. Time segment 230f begins at an end point of time segment 230e and the VVL within this time segment is steadily decreased. Time segment 230f begins at an end point of time segment 230e and the VVL within this time segment is kept constant until the end of the video timeline (T).

The VVE generated for video stream 200 adjusts the volume of video stream 200 but does not adjust the volume of a music stream to be synchronized therewith (described below). That is, the VVE is/are volume markers for video media. In order to adjust the volume of a music stream to be synchronized with video stream 200, volume markers for audio media are generated by the server 120. Volume markers for audio media are included with the video file (such as video stream 200) and referred to herein as a music volume envelope (MVE). An MVE may be generated for video stream 200, such as illustrated in FIG. 4.

Figure 4:
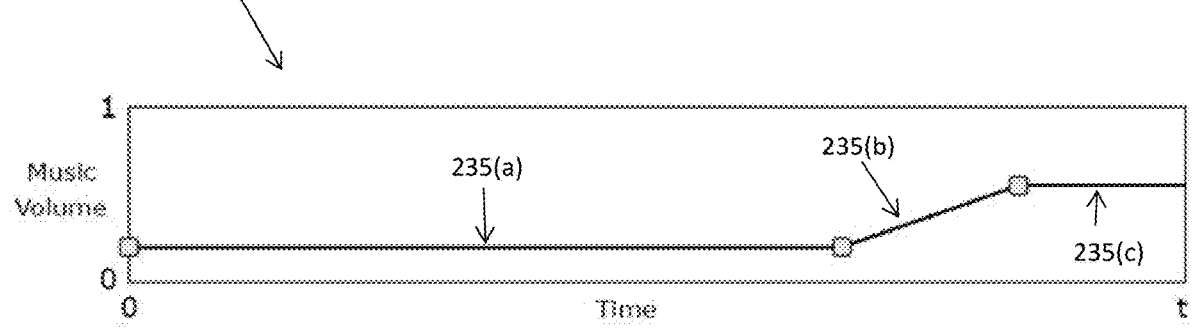
FIG. 4 shows a music volume envelope generated for a video stream according to an embodiment of the present disclosure.

As shown in FIG. 4, the exemplary video processing technique further involves generating by the server 120 at least one music volume envelope ("MVE") for video stream 200, which is referred to herein as generating music volume instructions. The MVE sets the music volume of a music stream which is to be synchronized with video stream 200. Note that the MVE of video stream 200 is applied to any music stream stored in the music database 115 that can be synchronized with video stream 200, whereby the volume of the music stream will be adjusted according to the MVE.

The MVE generated for video stream 200 shown in FIG. 4 includes time segments 235a, 235b, and 235c. Each time segment within the MVE may have a different music volume level (MVL). The music volume level may range from a minimum level 0 to a maximum level 1 with respect to video timeline (T) of video stream 200. Because an MVE is generated for every video stream and applied to any music stream during synchronization, the overall efficiency and scalability of the synchronization process is significantly enhanced. Looking at FIG. 4, during time segment 235a, the MVL is kept at a constant level (e.g., relatively low level). Hence, during playback of video stream 200, which has been synchronized with a music stream stored in the music database 115, the volume of the synchronized audio stream remains at the volume level indicated by segment 235a for the time portion (of video stream timeline (T)) corresponding to segment 235a. Time segment 235b begins at an end point of time segment 235a and the MVL is steadily increased throughout this time segment. Time segment 235c begins at an end point of time segment 235b and the MVL within this time segment is kept at a constant level (e.g., a relatively high level). Regarding time segment 235b, during playback of video stream 200, which has been synchronized with an audio stream (any audio stream), the volume of the synchronized audio stream increases according to time segment 235b for the time portion (of video stream timeline (T)) corresponding to segment 235b. For example, the music volume may increase leading up to video key frame moments, while the video volume decreases.

The MVE instruction to lower music volume during dialog is referred to as "audio ducking." The MVE adjusts the overall volume of the music stream, such that the level of one audio signal is reduced or changed by the presence of another signal. Once those instructions exist, there is no need to have another mechanism to lower the overall volume of the music stream. For example, during playback of video stream 200, if there are moments of dialog or other noteworthy sound events, audio ducking instructions may be applied to adjust the music volume so that the music volume is decreased during the dialog (or other noteworthy sound events of video stream 200), in order to give emphasize to the dialog (or any other noteworthy sound events of the video stream).

According to another embodiment of the present disclosure, the synchronization system may include audio processing logic configured to provide for a variety of dynamic audio ducking techniques, which may adaptively control the volume of concurrently outputted audio streams. For example, it may be desirable to adaptively duck the volume of a primary media file for a duration in which a secondary media file is being concurrently played in order to improve audio perceptibility. Audio processing circuitry may perform ducking techniques by identifying the loudness of concurrently played primary and secondary media files, and ducking one of the primary or secondary media files in order to maintain a desired relative loudness difference during the period of concurrent playback. For example, during such adaptive frequency audio ducking, the volume levels for a video stream may be altered in real time based on frequency levels of the video. Moreover, volume levels for a given frequency band of the music stream can be adjusted. For example, during such adaptive frequency audio ducking, the volume levels for a music stream may be altered in real time based on frequency levels of the video. Moreover, volume levels for a given frequency band of the music stream can be adjusted. The volume of both the video and audio streams can be adjusted by lowering/raising particular frequency bands so as to maintain some separation so that dialog can be heard.

Along with volume markers generated for video stream 200, additional markers pertaining to when a synchronized audio stream should begin playing in video stream 200 may be generated. These markers may include associated priorities and are referred to as video music start times.

Figure 5:
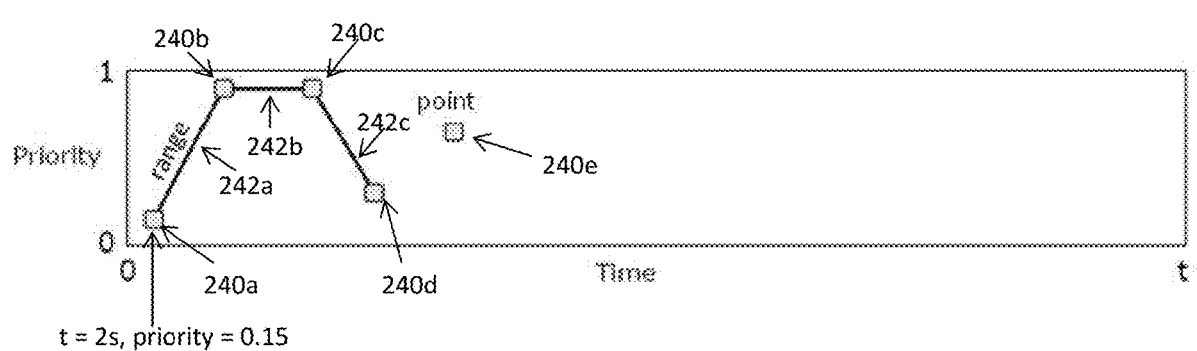
FIG. 5 shows video/music start times generated for a video stream according to an embodiment of the present disclosure.

As shown in FIG. 5, the exemplary video processing technique further involves generating, by the server 120, video/music start time markers for video stream 200. The video/music start time markers may set the preferred times, relative to timeline (T) of video stream 200, at which a music stream (which is to be synchronized with video stream 200) will begin playing, during playback of synchronized video/music (that is, synchronized with a music stream). The synchronization process of the present disclosure takes into account the video/music start times (points and ranges), along with points and ranges corresponding to other video markers (e.g., video key frame moments, music stream start times, and key sound moments), in order to determine the optimal synchronization of a music/audio stream with video stream 200.

Looking at FIG. 5, the video/music start time markers may be set as either "start points," such as shown by points 240a-e, or "ranges," as shown by ranges 242a-c. Every start point and point within a range has a priority component and a time component associated therewith. The priority level may range from a minimum value of 0 (lowest priority) to a maximum value of 1 (highest priority). The time component may be relative to video time line (T) of video stream 200. The video/music start time points and ranges indicate prioritized start times, relative to time line (T) of video stream 200, to begin playing a (synchronized) music stream.

For example, range 242a extends between two points, 240a and 240b. Point 240a corresponds to the lowest priority relative to time line (T) of video stream 200. Hence, point 240a indicates the least preferred video/music start time for video stream 200. Point 240b corresponds to the highest priority level relative to the video timeline (T). The priority level increases from point 240a until the end of range 242a at point 240b. Such priority level remains constant for range 242b, which is bound by points 240b and 240c. Hence, any portion of time corresponding to range 242b indicates the most preferred video/music start time. At the end of range 242b, range 242c begins, and marks a decrease in priority as range 242c advances in time from point 240c to point 240d. This decrease in priority, as range 240c advances in time, indicates less preferred video/music start times. Point 240e indicates the latest video/music start time and is assigned a priority value lower than the highest priority value, as indicated by range 240b.

Figure 6:
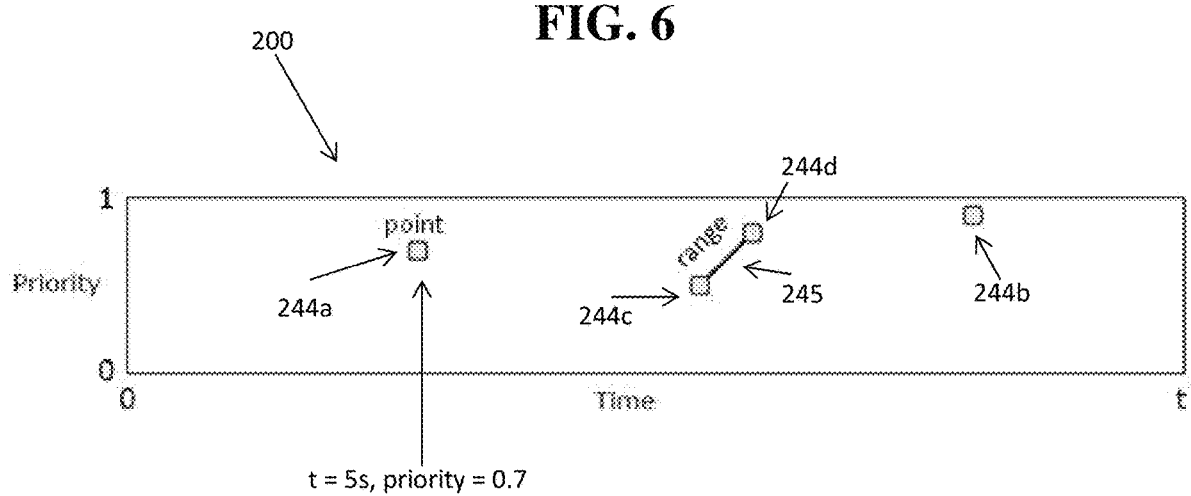
FIG. 6 shows video key frame moments generated for a video stream according to an embodiment of the present disclosure.

During the synchronization processing, point 240e, or any of the points of ranges 242a, 242b and 242c, may be determined to be an optimal video/music start time that would allow a video key frame moment (described below with reference to FIG. 6) to align with a music key sound moment (described below with reference to FIG. 8). The video key frame moments are markers that may indicate noteworthy moments within a video stream and are utilized, along with video/music start time markers (described below in reference to FIG. 7) and key sound markers associated with a music stream (such as music stream 300 illustrated in FIGS. 7 and 8) to determine an optimal and/or most preferred alignment of video stream 200 and music stream (such as music stream 300). FIG. 6 illustrates generating video key frame moment markers for video stream 200.

As shown in FIG. 6, the video processing technique further involves generating, by the server 120, video key frame moments generated for video stream 200. The video key frame moments mark noteworthy or key portions in video stream 200. For example, such noteworthy moments may include sudden changes, climaxes, explosions, battle scenes, gunshots, emotional, and/or any other significant moments in video stream 200. The video key frame moments set for video stream 200 are indicated by points 244a and 244b, and range 245 bounded by points 244c and 244d.

In one embodiment, the server 120 detects changes in the video stream 200 in order to generate video key frame moments that mark noteworthy or key portions in the video stream 200. For example, the locations of large changes in the video stream 200 may be used as potential boundaries for alignment with a music stream 300 (e.g., music file). Such change detection may be automatically determined by parameterizing the video stream 200 and then evaluating the parameterized video stream 200 to detect changes from frame to frame. Common types of video parameterization and evaluation include frame-to-frame pixel difference, color histogram difference, etc. In an embodiment, video is parameterized by sampling every 10th frame of video. Each frame may be sampled discretely, or an average of the 10 frames may be used to avoid aliasing. Alternatively, such change detection can be automatically determined using a color histogram associated with each frame as a feature vector. The difference in feature vectors between each sampled frame may be used to detect the changes in the video stream 200.

As previously described, points and points within ranges each have a priority component and a time component. Hence, points and points within ranges relating to video key frame moments indicate prioritized moments, relative to the video timeline (T). Point 244a marks the earliest video key frame moment to occur within video stream 200. A second video key frame moment for video stream 200 is indicated by the range 245 bounded by points 244c and 244d. Range 245 spans from a lower priority point 244c to a higher priority point 244d. The lower priority point 244c indicates the least prioritized point at which a video key frame moment occurs within range 245. Likewise, the higher priority point 244d indicates the highest prioritized point at which a video key frame moment occurs within range 245.

Although a video key frame moment occurs anywhere along range 245, the optimal time corresponding to the occurrence of a video key frame moment is indicated by point 244d. For example, video stream 200 may have a battle scene (e.g., video key frame moment) occurring at the time portion, relative to the video timeline (T), corresponding to range 245. Within this range, point 244d may indicate the exact time at which the battle scene begins. Point 244d is thus marked with the highest priority within range 245. Likewise, point 244c may indicate a few seconds before the battle scene occurs. Thus, point 244c is marked with a lower priority. The last video key frame moment occurs at point 244b, which is set with the highest priority video key frame moment. Point 244*b* occurs towards the end of the video timeline (T), which indicates that towards the end of video stream 200, the highest priority video key frame-moment occurs.

The video key frame moments, video/music start times, music volume envelope, video volume envelope and video start, end and fade time markers of the video processing stage have been described above. It is understood that the video processing stage is not limited to the aforementioned markers and may include additional markers and/or processing stages. For example, additional processing filters and the like may be included in the video processing stage without departing from the scope of the present invention.

In addition to the video processing stage, a music processing stage is performed. The music processing stage generates markers for audio media, such as a music stream 300 illustrated in FIGS. 7 and 8. The markers generated for music stream 300 include at least music stream start time markers and key sound frame markers. These markers, for music stream 300, along with the markers generated for video stream 200, are utilized by the server 120 to determine an optimal and/or most preferred alignment of video stream 200 with music stream 300.

Figure 7:
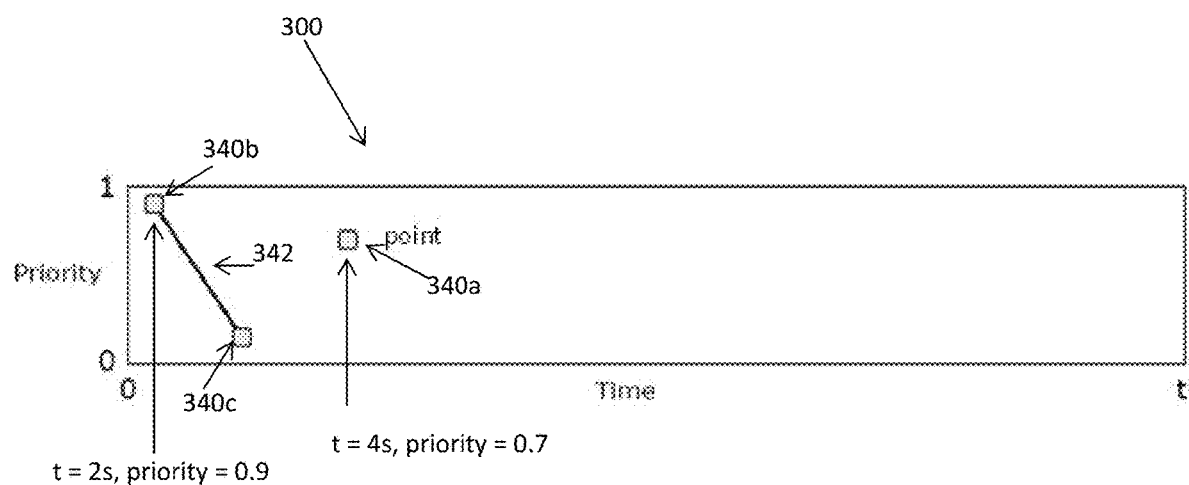
FIG. 7 shows music stream start times generated for a music stream according to an embodiment of the present disclosure.
Figure 8:
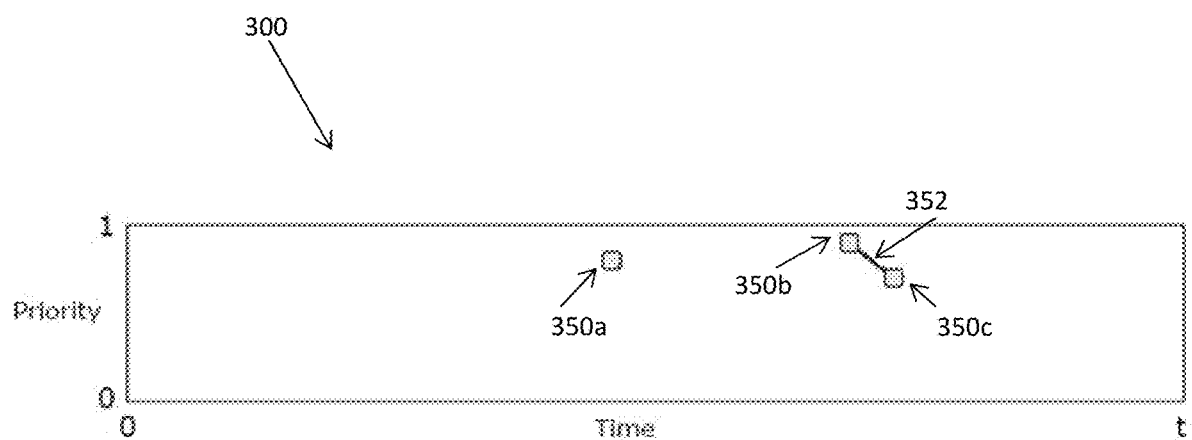
FIG. 8 shows music key sound moments generated for a music stream according to an embodiment of the present disclosure.

Exemplary Music Processing Technique:

FIGS. 7 and 8 show an exemplary embodiment of a music processing operation for music stream 300 (e.g., music clips or digitized music files). Note that every music stream 300 in the music database 115 will undergo the same processing operation. The music stream 300 may be predetermined portions of audio extracted from a music file or an entire music file. For example, the music stream 300 may be a 40 second segment of a 4 minute song. The music stream 300 is not limited to any particular type of media, duration, or content. The music stream 300 does not need to be related to the video stream 200 in any way.

As shown in FIG. 7, the music processing operation involves generating by the server 120 one or more music time markers for music stream 300. The music time markers and music stream 300 may be encoded. The music time marker may include a music stream start time marker. Similar to the video stream 200, the music stream 300 has a duration (0 to t) illustrated by music timeline (T). The music stream start time marker identifies an optimal time, relative to the music timeline (T), for the music stream to start playing.

Looking at FIG. 7, one or more music stream start time markers, such as a "point" as shown by music stream start point 340*a*, or "range" as shown by music stream start range 342 which is bound by music stream points 340*b* and 340*c*, is generated by the server 120 for music stream 300. The music stream start time marker operates as the starting/entry point of the music to be played for the music stream 300. That is, the music stream start time marker indicates, from which time point, relative to music timeline (T), to start playing the music stream 300 during playback of the to be synchronized video/audio. The music stream start time may mark the beginning of a sound stream, the start of a verse, or any other noteworthy entry point of the music stream 300.

In one embodiment, the server 120 detects changes in the music stream 300 in order to generate music key sound moments that mark noteworthy or key portions in the music stream 300. For example, the locations of large changes in the music stream 300 may be used as potential boundaries for alignment with a video stream 200. Such change detection may be automatically determined by parameterizing the music stream 300 and then evaluating the parameterized music stream 300 to detect changes from frame to frame. In an embodiment, the music stream is parameterized by sampling at 1/10 second intervals. Once the music stream 300 has been parameterized, the difference between frames is used to detect changes in the music stream 300. Similar to the video stream start time markers, the music stream start time markers may be either "points," such as shown by music stream start point 340*a*, or "ranges," such as shown by music stream start range 342 which is bound by music stream points 340*b* and 340*c*. Each of the music stream start points and ranges has both a priority component (which may range from a minimum value of 0 to a maximum value of 1 with 0 having the lowest priority and 1 having the highest priority) and a time component relative to the music timeline (T). For example, the music stream start range 342 includes a high priority music stream point 340*b* and a low priority music stream point 340*c*. The high priority music stream point 340*b* indicates the most preferred moment in time, within music stream start range 342, from which to begin/start playing music from the music stream 300.

For example, if the music stream 300 is a 45 second clip extracted from a song, a noteworthy moment (such as a chorus) may occur at the 5 second mark of the music timeline (T). Thus, a music start time at the 5 second mark may be generated to account for the chorus. In this example, during playback of synchronized video-audio, only the portion of the music stream beginning from the 5 second mark of the music timeline (T) is played.

In music stream start range 342, the music stream start point 340*b* is the most preferred point in time from which the music stream 300 should begin/start from, and the music stream start point 340*c* is the least preferred point in time in range 342 from which the music stream 300 should begin/start from. For example, it may be the case that the middle of a crescendo or music swell occurs at the 15 second mark of music stream 300. The middle of a crescendo or music swell would likely be assigned a priority of "0" (not an appropriate time to start from). A low-priority musical starting point is a sufficient time to start; however, a point in time having a "0" priority is not. For example, a low priority start point may be the start of the second measure of a verse instead of the first measure of the verse. Music stream start ranges may be generated for musical starting points when there is no clear beat defined, such as with classical music or certain guitar feedback noise prior to a beat kicking in.

Music stream start point 340*a* indicates another preferred music stream start time and in this example is the last indicated music stream start time. In sum, the music stream start time for the music stream 300 depicted in FIG. 7 may be at any time within the music stream start range 342 (including at music stream points 340*b* and 340*c*) or at the music stream start point 340*a* depending on the synchronization processing (discussed below with reference to FIGS. 9 and 10).

Along with the music stream start time markers, markers indicating noteworthy moments within music stream 300 may also be generated by the server 120. Such markers may indicate noteworthy moments for a music stream, and are referred to herein as key sound moments. Both music stream start time markers and key sound moment markers, along with the markers generated for video stream 200 discussed with reference to FIGS. 2-6 are utilized for synchronizing the video stream 200 and music stream 300.

As shown in FIG. 8, the audio processing operation further involves generating by the server 120 one or more music key sound moments within music stream 300. The music key sound moments indicate noteworthy or significant moments of music stream 300. For example, a noteworthy moment of music stream 300 may be a chorus or music swell of a song. Any noteworthy moment of audio may be generated for music stream 300.

Music key sound moments may be generated as a music key sound moment point, such as shown with reference numeral 350a, and/or a music key sound moment range, such as shown with reference numeral 352. Music key sound moment range 352 is bound by music key sound points 350b and 350c. Here, the music key sound moment point 350a indicates that a music key sound moment occurs at the time point of audio timeline (T) that corresponds to point 350a. Similarly, audio key sound moment range 352 indicates that a key sound moment occurs along the time portion of music timeline (T) that corresponds to range 352.

During the alignment/synchronization process, the video markers generated for the video stream 200 (shown in FIGS. 2-6), and the music stream start points and ranges (shown in FIG. 7) and the music key sound moment points and ranges (shown in FIG. 8) of the music stream 300, are utilized by the server 120 to determine an optimal and/or preferred synchronization of video and audio. The synchronization processing performed by the server 120 is described in more detail below with reference to FIGS. 9 and 10.

In addition to the video processing stage, a music processing stage is performed. The music processing stage generates markers for audio media, such as a music stream 300 illustrated in FIGS. 7 and 8. The markers generated for music stream 300 include at least music stream start time markers and key sound frame markers. These markers, for music stream 300, along with the markers generated for video stream 200, are utilized by the server 120 to determine an optimal and/or most preferred alignment of video stream 200 with music stream 300.

In accordance with the foregoing, each video clip stored in the video database 112 is run through the exemplary video processing operations described above (FIGS. 2-6), and each music clip stored in the music database 115 is run through the exemplary music processing operations described above (FIGS. 7 and 8). Through this process, the video clips are assigned video markers and the music clips are assigned music markers—which can be done using an automated computer-assisted process. Milliseconds (near real time) before a video clip and music clip are synchronized and played together, a series of computer-automated calculations are made at very high speed, making the process appear to take place "in real time" (described in more detail below). The calculations determine the optimal time during the video clip at which to begin playing the music clip. Similarly, the optimal time to begin the music relative to the music clip itself is determined—representing the best moment to start the music clip. Every music starting point combination given by video/music start times (VMST) and music clip start times (MCST) is automatically determined.

The combinations which would result in a video key frame moment coinciding (within a given threshold) with a music key sound moment are then ordered by the product of the priorities of the Start Times and Key Moment priorities. Exemplary Formula to Determine a Key Frame Match:

In addition, in accordance with the foregoing, the following equation may be utilized by the synchronization computer system 100 or server 120 to determine an optimal and/or most preferred alignment of video stream 200 and music stream 300. In particular, the server 120 assigns priority numbers to all time steps in the video and music clips. Such priorities may be initially assigned based on the relative importance or emotional intensity of segments of the video frames. Most time steps in both video and music clips have a priority value of zero. Certain key frames and some other user-defined relevant moments in both video and music clips are assigned a priority value greater than zero, up to 1 (maximum).

Below is one example of the logic and formula behind this process:

Let $P_v(i)$=priority number assigned to video clip time step (or moment) "i". Variable "i" can vary from 1 to $N_v$ ($N_v$=total number of video time steps).

Let $P_m(j)$=priority number assigned to music clip time step (or moment) "j". Variable "j" varies from 1 to $N_m$ ($N_m$=total number of music clip time steps).

The total priority function $P(v_l, m_k)$, computed for the case when the Music attempts to start at time v in the Video clip (and the Music starts to play from time $m_k$ in the Music clip), is given by the double sum:

$$P(v_l, m_k) = \sum_{i=v_l}^{N_v} \sum_{j=m_k}^{N_m} P_v(i) P_m(j)$$

Once $P(v_l, m_k)$ is computed for all possible combinations $(v_l, m_k)$, then the maximum is computed. Mathematically, this is a search for:

$\max\lfloor P(v_l, m_k) \rfloor$ for $1 \leq v_l \leq N_v$ and $1 \leq m_k \leq N_m$ The maximum value is achieved at particular values $v_l = v^*$ and $m_k = m^*$. The optimum video-music match is when the music starts playing at time $v^*$ in the video clip, and the music starts from time $m^*$ in the music clip.

If no combination is found wherein the Key Moments (video and music) would closely align (e.g., within a predetermined threshold), the music relative to the video begins at the first highest priority of the video/music start times and, within the music clip-wise, Music it will start from the first highest priority of the music clip start times.

The following is an example of how the above synchronization process can be computer coded:

```
let Combos be declared as list of contending combinations of musical starting points.
loop from 0 to video max time in small increments
   let vt1 be this time relative to video
   if music start priority (relative to video time) at time vt1 is greater than zero:
      loop from 0 to music max time in small increments
         let mt1 be this time relative to music
         if music start priority (relative to music) at time mt1 is greater than zero:
            loop from vt1 to video max time in small increments
               let vt2 be this time relative to video
               if a video key moment is found near vt2:
                  loop from mt1 + vt2 − vt1 to music max time in small increments
                     let mt2 be this time relative to music
``` if a music key moment is found near mt2:
  add to Combos the music start times both relative to music and video clip, as well as a priority value.
    the priority value is given as:
            priority of video key moment near vt2
          * priority of music key moment near mt2
        * priority of music start priority relative to video at time vt1
      * priority of music start priority relative to music at time mt1
  Sort the Combos by priority.
  The one with the highest priority determines the music starting points relative to both video and music clips.

Legend:
vtmax is time duration of the video clip
mtmax is time duration of the music clip
mt1 can be viewed as the potential starting time for music relative to music.
vt1 can be viewed as the potential starting time for music relative to video.
mt1 and mt2 are times relative to music
vt1 and vt2 are times relative to video
the function f(mt1, vt1, mt2, vt2) is given as:
(priority of music starting relative to video at video time vt1 *
priority of music starting relative to music at music time mt1 *
priority of music key moment at time (mt1 + vt2 − vt1) relative to music *

Figure 9:
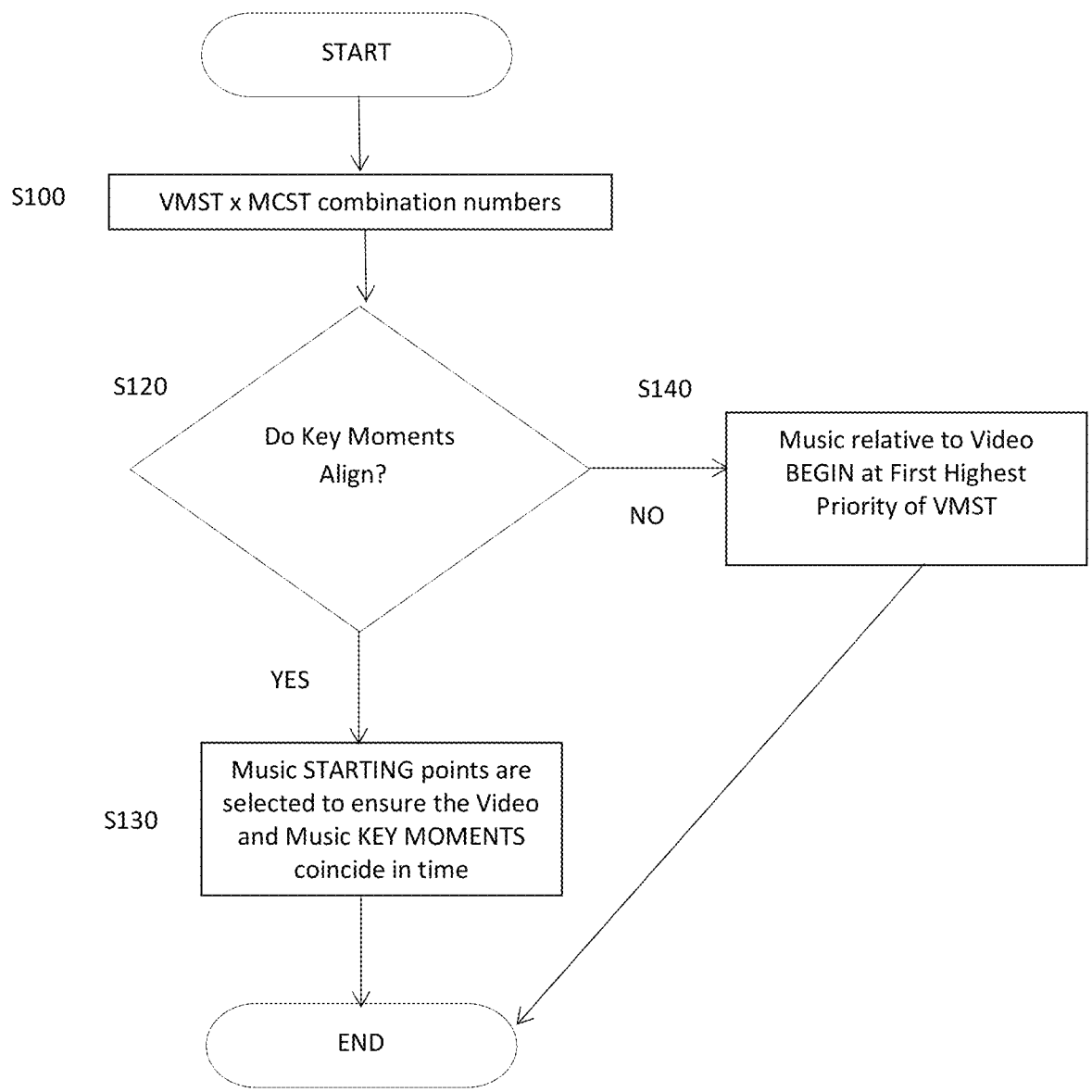
FIG. 9 shows a flowchart illustrating a high level synchronization logic according to an embodiment of the present disclosure.

Exemplary Synchronization Processing Technique:

FIG. 9 shows a flow chart of an exemplary synchronization logic for the present invention. At step S100, various combinations of video/music start times ("VMST") (generated for video stream 200, such as shown in FIG. 5) and music stream start times ("MCST") (generated for music stream 300, such as shown in FIG. 7) are computed by the server 120 to determine any combination(s) of video/music start times and music stream start times that would result in a video key frame moment aligning (within a threshold) with a music key sound moment. By way of example, the threshold is plus or minus one-half the interval of advancement, which may be ¹/₁₀ of a second (e.g., threshold of −0.05 to +0.05 seconds).

If at step S120 any combination(s) (e.g., VMST and MCST time pair) has key moments that align, then at step S130, the VMST and MCST pair are ordered based on the associated priorities generated for the video and music start times and the video and music key moments. The VMST and MCST pair having the highest priority, among all VMST/MCST pairs determined to have aligned key moments, will be determined by the server 120 to be the VMST and the MCST selected for playback of the synchronized video-audio. In the event of a tie, the first tie-breaker is preferably to use the earliest VMST. If they both share the same VMST, then the second tie breaker is preferably the earliest MCST.

However, in the event that no combinations/pairs are determined wherein the key moments (of video stream 200 and music stream 300) align, then at step S140, the VMST of video stream 200 having the first highest priority (e.g., point 240b) is determined as the VMST, and the MCST of music stream 300 having the first highest priority (e.g., point 340b) is determined as the MCST. The synchronization logic described above is described in more detail with reference to FIG. 10.

Figure 10:
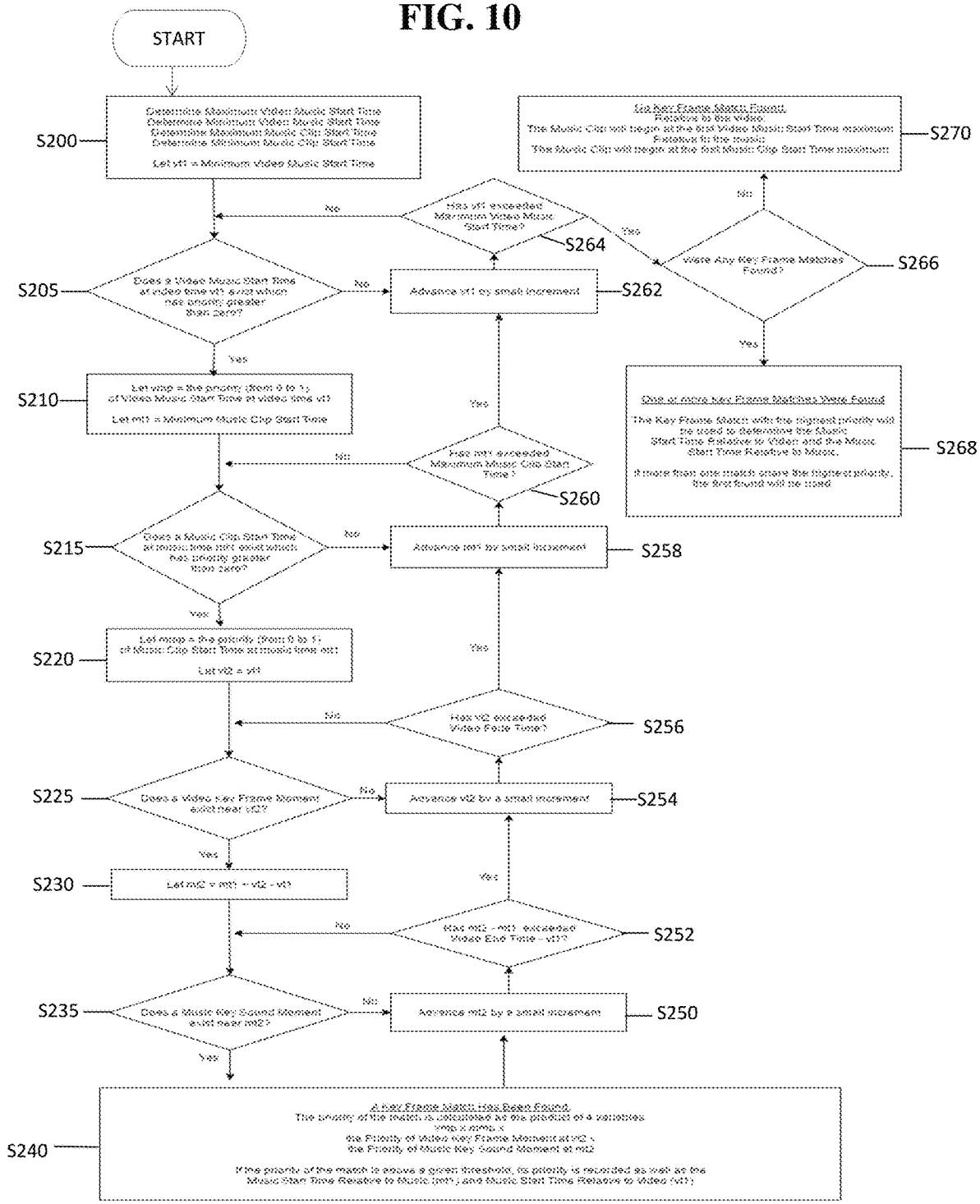
FIG. 10 shows a flowchart illustrating a computer-aided synchronization processing technique according to an embodiment of the present disclosure.

FIG. 10 shows a protocol for the server 120 to perform real-time computer-aided synchronization processing according to an embodiment of the present disclosure.

Beginning at step S200, synchronization logic determines the maximum and minimum VMST for video stream 200 as well as the maximum and minimum MCST for music stream 300. The maximum and minimum start times identify a time window in which the synchronization logic searches for prioritized VMST (such as shown in FIG. 5) which have been generated for video stream 200 and prioritized MCST (such as shown in FIG. 7) generated for music stream 300.

For example, referring to FIG. 5, a maximum VMST for video stream 200 may correspond to video/music start point 240e. Whereas a minimum VMST for video stream 200 may correspond to video/music start point 240a. Likewise, referring to FIG. 7, a maximum MCST for music stream 300 may correspond to music stream start time point 340a. Whereas a minimum MCST for music stream 300 may correspond to point 340b. Within the time window indicated by the maximum and minimum start times, the synchronization logic searches prioritized VMST and MCST to determine any combination(s) of VMST and MCST that would result in a video key frame moment aligning (within a threshold) with a music key sound moment (discussed below). Again, by way of example, the threshold is plus or minus one-half the interval of advancement, which may be ¹/₁₀ of a second (e.g., threshold of −0.05 to +0.05 seconds).

A variable vt1 is initialized to determine whether an associated priority greater than zero exists at vt1. Here, vt1 is initialized to the minimum VMST, and the synchronization logic determines whether a VMST at video time vt1 exists which has a priority greater than zero. For example, referring again to FIG. 5, video stream 200 will have a minimum music start time at vt1=2 seconds. The synchronization logic then begins searching the VMST priorities from vt1=2 seconds.

Next, at step S205, the synchronization logic determines whether a prioritized VMST exists at the minimum VMST with a priority greater than zero. For example, referring to FIG. 5, at vt1=2 seconds, the synchronization logic determines whether there is a video music start time with a priority greater than zero. Because video/music start time point 240a has a priority of 0.15 at vt=2 seconds, it is determined that the priority at vt1 is greater than 0 and the synchronization logic proceeds to step S210.

If it is determined that vt1 is not greater than 0, then, at step S262, the synchronization logic initializes vt1 to the next minimum VMST, and the synchronization logic determines whether a VMST at video time vt1 exists which has a priority greater than zero. The synchronization logic will repeat this process until it determines a vt1 having a priority greater than 0, or until it determines that the vt1 has exceeded the maximum VMST. If it is determined that the vt1 has exceeded the maximum VMST, then, at step S266, the synchronization logic determines whether there are any key frame matches between the VMST and MCST. If one or more key frame matches were found, then, at step S268, the synchronization logic uses the key frame match with the highest priority in order to determine the MCST relative to the video stream 200 and the MCST relative to the music stream 300. If more than one match share the same highest priority, then the first (earliest in time) is used. However, if no key frame matches were found, then, at step S270, relative to the video stream 200, the synchronization logic will begin playing the music stream 300 at the first maximum VMST, and, relative to the music stream 300, the synchronization logic will begin playing the music stream 300 at the first maximum MCST.

Upon determining that the priority at vt1 is greater than 0, then at step S210, the synchronization logic initializes a variable vmp as the priority (from 0 to 1) of VMST vt1. For example, referring to FIG. 5, the vmp is 0.15. The synchronization logic also initializes a variable mt1 to the minimum MCST to search and determine whether an associated priority greater than zero exists at time mt1. For example, referring to FIG. 7, the mt1 is 0.5 seconds.

At step S215, the synchronization logic determines whether, at time mt1, a prioritized MCST exists having a priority that is greater than zero. For example, referring to FIG. 7, music stream 300 has a minimum MCST at mt1=2 seconds, which corresponds to prioritized MCST 340b. Hence, the synchronization logic begins searching the music stream start time priorities from mt1=2 seconds. As shown in FIG. 7, music stream 300 has a priority of 0.9 at mt1=2 seconds. Because at mt1=2 seconds there exists a prioritized point 340b which as a priority greater than 0 (e.g., 0.9), the synchronization logic proceeds to step S220.

However, if it is determined that mt1 is not greater than 0, then, at step S258, the synchronization logic initializes mt1 to the next minimum MCST, and the synchronization logic determines whether a MCST at music time mt1 exists which has a priority greater than zero. The synchronization logic will repeat this process until it determines a mt1 having a priority greater than 0, or until it determines that the mt1 has exceeded the maximum MCST. If it is determined that the mt1 has exceeded the maximum VMST, then, the synchronization logic will repeat steps s262 and s264, as described above.

At step S220, the synchronization logic stores in a memory the priority level associated with mt1=0.5 seconds (priority of 0.9) and initializes a variable vt2 to a value of vt1 in order to search for video key frame moments. The purpose of initializing variable vt2 to vt1 is to determine whether a video key frame moment exists for a time point (e.g., vt1=2 seconds) at which a prioritized VMST having a priority greater than zero is found (e.g., priority of 0.15).

For example, when vt2 is initialized to vt1, the synchronization logic determines whether a video key frame moment exists "near" or within a predetermined threshold of a time point in which a prioritized video/music start time having a priority greater than zero is found. In this example, "near" or the predetermined threshold is understood to mean that when looping through in relatively small time increments, e.g., 0.1 to 0.2 second intervals, the threshold is plus or minus half such time increment. For example, if you are advancing at 0.1 second, you look behind 0.5 second and ahead 0.5 second. Thus, when looping through in 0.10 second increments, a match occurs if the absolute value of the difference of the times under consideration is less than 0.10 second. In other words, the plus or minus threshold is half the "small increment."

Referring to FIG. 6, using the variable vt2, which is initialized to 2 seconds (the value of vt1 at which a prioritized video music start time having priority>0 is found), a search is performed at step S225 to determine whether a video key frame moment exists for video stream 200 at vt2=2 seconds. In this particular embodiment, video stream 200 does not have a video key frame moment near (within a predetermined threshold) vt2=2 seconds, so the synchronization logic proceeds to step S254. Again, by way of example, the threshold is plus or minus one-half the interval of advancement, which may be ⅒ of a second (e.g., threshold of −0.05 to +0.05 seconds).

At step S254, the synchronization logic increments vt2 by a predetermined amount to search whether there is a video key frame moment that exists near (within a predetermined threshold) this point. That is, the synchronization logic, upon not finding a video key frame moment at vt2=2 seconds, increments vt2 by a small amount (for example, by 0.1 second) to determine whether a video key frame moment exist at the incremented vt2 point.

For example, in FIG. 6, the synchronization logic will determine whether there exists a video key frame at incremented time point vt2=2.1 seconds. As shown, a video key frame does not exist at vt2=2.1 seconds, so the synchronization logic again increments vt2 by a small amount (for example, again by 0.1 second) to determine whether a video key frame exist at the new incremented vt2 point. The synchronization logic increments vt2 until a video key frame moment is found or until at step S256, the synchronization logic determines that vt2 has exceeded the video fade time (the fade time as indicated by fade time 215 shown in FIG. 2).

Continuing with step S254, vt2 will be incremented until, as shown in FIG. 6, vt2=5 seconds (which corresponds to video key frame moment marked by point 690a) (It is understood that vt2 does not need to be exactly 5 seconds. For example, vt2 can be between 5 seconds−half increment and 5 seconds+half increment). Because a video key frame moment is determined to exist at vt2=5 seconds, at step S230, the synchronization logic initializes a variable mt2 to search and determine whether a key sound moment exists at a time point which corresponds to the time at which a video key frame moment is found (e.g., at the 5 second mark of the timeline (T)). The initialization of mt2 is obtained by setting mt2=mt1+vt2−vt1. For example, given the aforementioned examples, mt2=2 s (mt1)+5 s (vt2)−2 s (vt1)=5 s. Thus, mt2 is initialized to 5 seconds to determine whether a key sound moment exists near (within a given threshold) a time point at which a video key frame moment is found (vt2=5 seconds). Again, by way of example, the threshold is plus or minus one-half the interval of advancement, which may be ⅒ of a second (e.g., threshold of −0.05 to +0.05 seconds).

At step S235, the synchronization logic determines whether a key sound moment exist near mt2=5 seconds (within a given threshold). For example, referring to FIG. 8, point 350a exists at t=7 s. Thus, if a given threshold is at 0.05 seconds (plus or minus), then when the synchronization logic searches for key sound moments that exist near mt2=5 seconds, the synchronization logic will determine that no key sound moment exists near mt2=5 seconds (with a plus or minus 0.05 second threshold).

If, however, at step S235, the synchronization logic determines that a music key sound moment exists near (within a given threshold) mt2, then at step S240, the synchronization logic identifies a key frame moment that matches/aligns with a key sound moment so the synchronization logic stores the priority and time value identified for the key frame moment and the priority and time values identified for the key sound moment.

In this example, because no music key sound moment exists near mt2, the synchronization logic would proceed to steps S250 and S252. At step S250, the synchronization logic increments mt2 by a predetermined amount (e.g., small increment of 0.10 seconds), and as long as the incremented mt2 amount does not result in a video end time being exceeded at step S252, the synchronization logic proceeds to step S235 again to search and determine whether there is a key sound moment that exists near (within a predetermined threshold) the incremented mt2 point.

For example, referring to FIG. 8, the synchronization logic would determine that a key sound moment does not exist near mt2=5 seconds. Thus, the synchronization logic would proceed to step S250 to increment mt2 by a small amount (e.g., by 0.1 second). Then, at step S252, the synchronization logic would determine whether the new incremented mt2 value of 5.1 seconds results in a video end time being exceeded. In particular, the synchronization logic determines whether the incremented mt2 value would result in a video end time (e.g., 30 s) being exceeded by determining whether the mt2−mt1>video end time−vt1. As long as an incremented mt2 value does not result in a video end time being exceeded, the synchronization proceeds again to step S235 to determine whether a key sound moment exists at or near the incremented mt2 value of 5.1 s.

Referring to FIG. 8, since there is no key sound moments that exists near 5.1 seconds, the synchronization logic would again proceed to step S250 to increment mt2 to a value of 5.2 s (given that a predetermined increment amount is set 0.1 s for example). Again, the synchronization logic proceeds to step S252 and as long as the new incremented mt2 value does not result in a video end time being exceeded, the synchronization logic again proceeds to step S235. Since, as shown in FIG. 8, no other key sound moments exist at 5.2 seconds or at a time point greater than 5.2 seconds, the synchronization logic will cycle through steps S235, S250, and S252 until eventually at S252, an incremented mt2 value would result in a video end time being exceeded. When, at S252, an incremented mt2 value would result in a video end time being exceeded, the synchronization logic proceeds to S254.

The method and system for computer-aided synchronization processing of video with music described in exemplary FIGS. 1-10 may be used a wide range of applications, including gaming applications. Examples of such applications are described below to help illustrate aspects of the technology, but the examples do not describe all possible examples. Examples are not limited to the specific implementations, arrangements, displays, features, approaches, or scenarios provided herein. A given example may include additional or different technical features, mechanisms, and/ or data structures, for instance, and may otherwise depart from the examples provided herein. Additional technical applications of the principles illustrated by particular examples herein, which would occur to one skilled in the relevant art(s) and having possession of this disclosure, should be considered within the scope of the claims.

Figure 11:
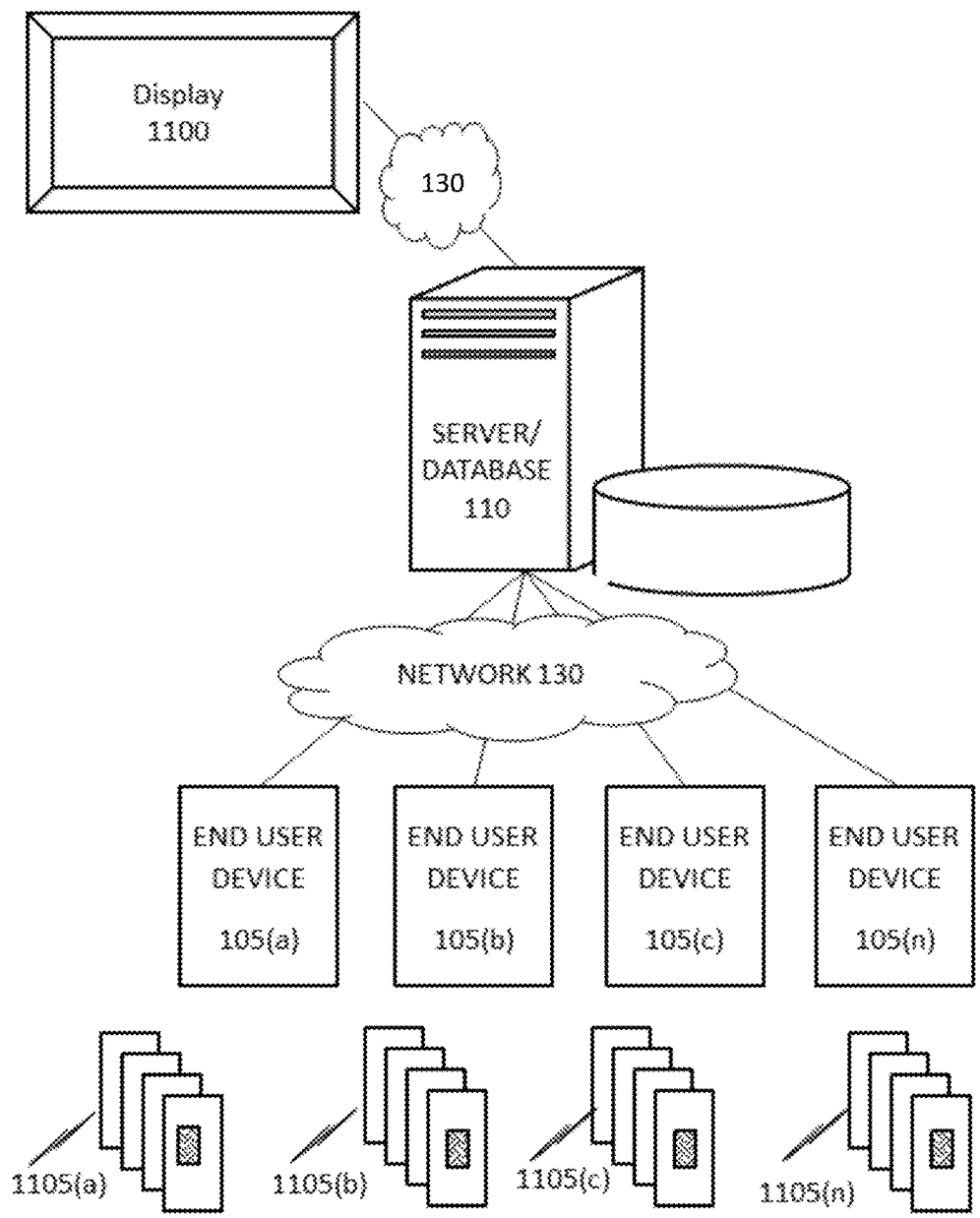
FIG. 11 illustrates components of an exemplary embodiment of a computer game application using the computer-aided synchronization processing of video with music described above in FIGS. 1-10.
Figure 12A:
FIGS. 12(a) and (b) illustrate exemplary playing cards in connection a computer game application using the computer-aided synchronization processing of video with music according to an embodiment of the present disclosure.
Figure 15A:
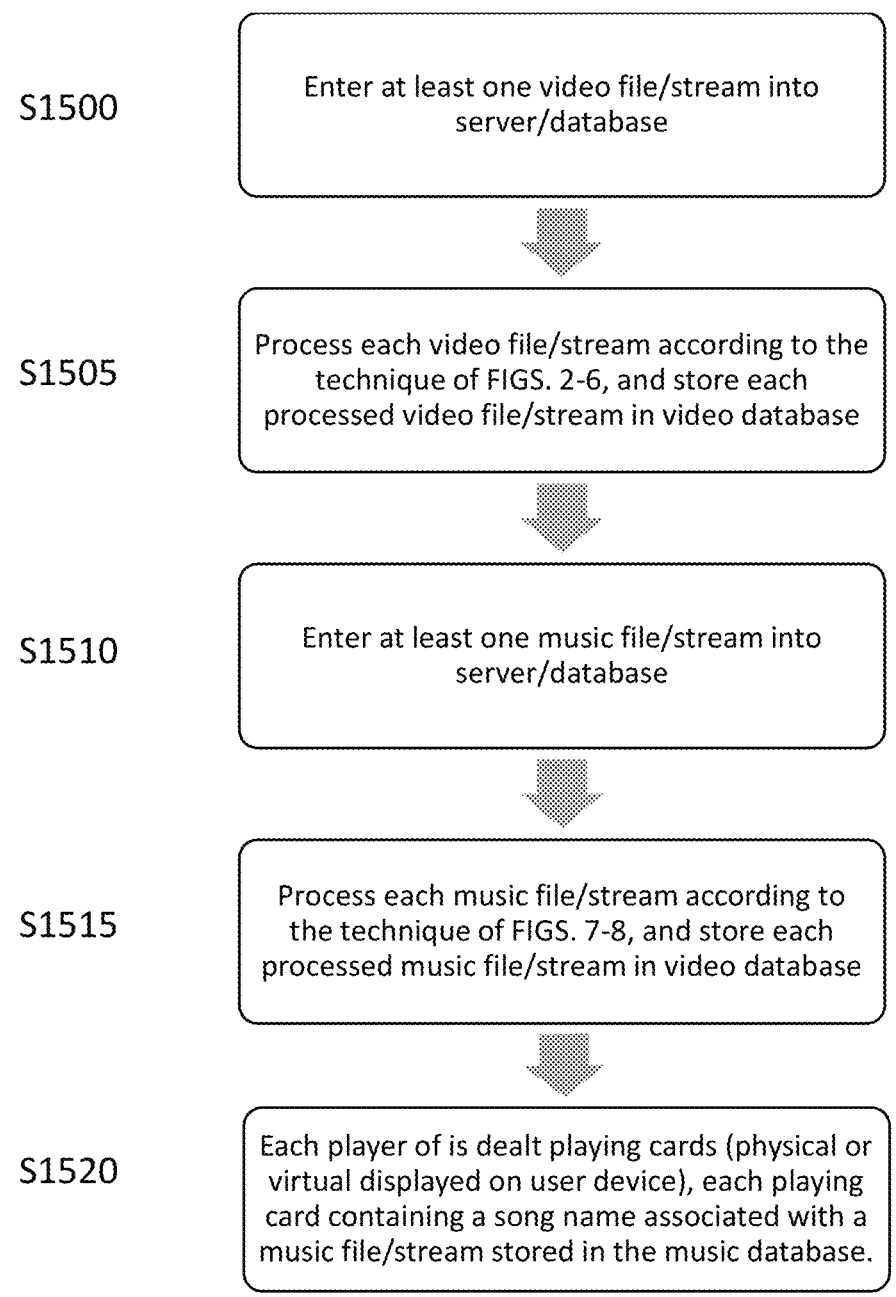
FIGS. 15(A)-(B) is a flowchart of an exemplary method for playing a computer game application using the computer-aided synchronization processing of video with music according to an embodiment of the present disclosure.
Figure 15B:
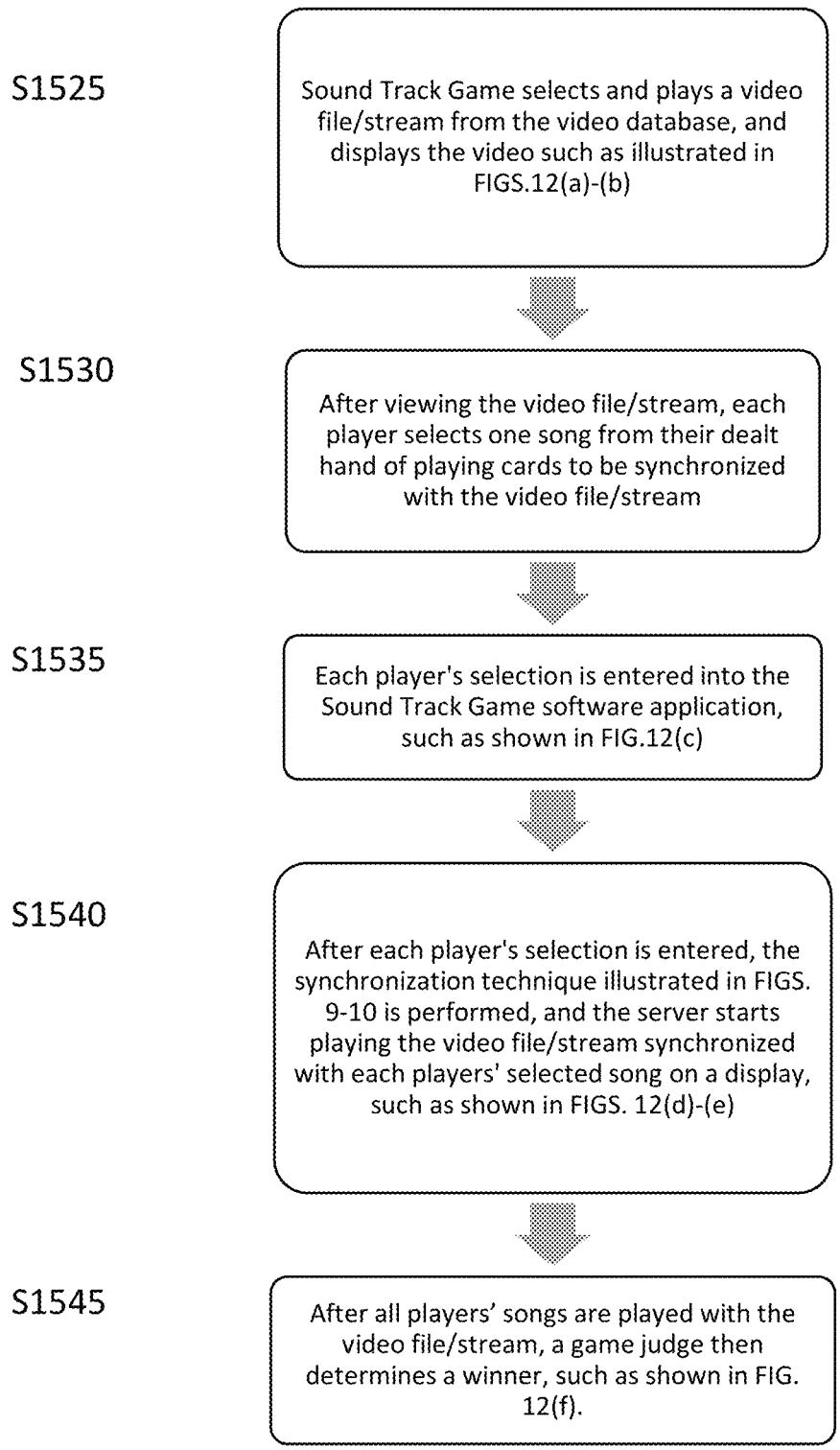

Exemplary Applications:

A. Soundtrack Game Application Embodiment:

FIG. 11 illustrates components of an exemplary embodiment of a gaming application using the computer-aided synchronization processing of video with music described above in FIGS. 1-10. FIGS. 12(a) and (b) illustrate exemplary playing cards that may be used in connection with the game application. FIGS. 13(a)-(f) illustrate exemplary screen shots displayed in connection with the game application (e.g., as seen on a television, computer monitor, or other game screen display). FIGS. 14(a)-(f) show an exemplary graphical user interface (GUI) generated by the server 120 and displayed on a user device in connection with the game application. FIGS. 15(A)-(B) is a flowchart of an exemplary method for playing the game application.

Referring to FIG. 11, the computer gaming application (referred to herein as "Soundtrack Game Application") is an interactive software game featuring movie clips synchronized with song clips that is played by one or more players using a computer system 100 comprising one or more server/database 120, one or more networks 130, one or more end user devices 105, and at least one display 1100 (e.g., a television, computer monitor, tablet/smart phone display, etc.). The Soundtrack Game Application further includes playing cards 1105(a)-(n) related to the game (e.g., each playing card may identify a song name). The components of the computer system 100 and the playing cards 1105 may communicate with each other via the communication network 130, such as the Internet or a private network associated with each of the above-mentioned components as described in FIG. 1. The components of the computer system 100 function substantially the same as described above with respect to FIGS. 1-10.

In operation, the server 120 may generate a graphical user interface ("GUI"), receive input related (e.g., information associated with the Soundtrack Game Application), perform the synchronization processing of video with music as described above in FIGS. 1-10, and transmit the synchronized video with music to display 1100 and/or to one or more user devices 1105 to be played and displayed. The Soundtrack Game Application utilizes video streams 200 (e.g., video files) stored in a video database 110 and music streams 300 stored in a music database 115. The video database 110 and music database 115 are stored in memory 124 and the video streams 200 (e.g., video files) and music streams 300 (e.g., music files) are processed via processor 122 of server 120 using the synchronization technique described in FIGS. 2-10.

More particularly, the video streams 200 may be stored in the video database 110 after undergoing the video processing operation, such as described in exemplary FIGS. 2-6. As described above, each video stream 200 (e.g., video file) may be a movie clip (e.g., a relevant 30 second segment of a film/video material, like a fight scene, a dramatic event, an emotional scene, or a sports/news clip; or any video). The processor 122 is configured to perform the video processing operation only once to each video stream 200 regardless of the music stream 300 (e.g., music file) that it may later be synchronized with.

The music streams 300 may be stored in the music database 115 after undergoing the music processing operation, such as described in FIGS. 7 and 8. The music streams 300 in the music database 115 can be synchronized with any of the video streams 200 in the video database 112 at any time during the game (discussed below). As described above, each music stream 300 may be a song clip (e.g., a 30 second segment of a song). The processor 122 is configured to perform the music processing operation only once to each music stream 300 regardless of the video stream 200 that it may later be synchronized with.

In operation, the computer system 100 is configured to randomly select a video clip/stream 200 from the video database 112 and then play the movie clip/stream 200 on display 1100 or end user device 105, such as shown in exemplary embodiment screenshots using of the Soundtrack Game Application illustrated in FIG. 13. Prior to the movie clip/stream 200 being selected and played, each player is dealt at least one playing card by a dealer at random, with each playing card 1105 containing a name of a song associated with a music clip/stream 300 from the music database 115. The dealer may be a player who is tasked with dealing or distributing the playing cards 1105 to each player, or a virtual dealer instructed by the software application to transmit virtual playing card(s) to each end user device 105. Ideally, each player is dealt 5 playing cards.

Figure 12B:

The playing cards 1105 may be physical cards, such as shown in FIGS. 12(a) and (b), or virtual playing cards presented on a graphical user interface (GUI) generated by the server 120 and displayed on each respective user device 105. For example, the physical playing card 1105 may have the name of a song and other related information printed on one side thereof, such as shown in FIG. 12(a). The opposite side of the physical playing card may have a bar code, QR code, or the like, such as shown in FIG. 12(b), to be scanned by the user device or other reader and entered into the computer system 100 during gameplay. Employing bar code or QR code technology into the playing cards 1105 is beneficial in that it ensures anonymity of the player and speeds up gameplay so that the song information does not need to be manually entered into the software application.

Figure 13A:
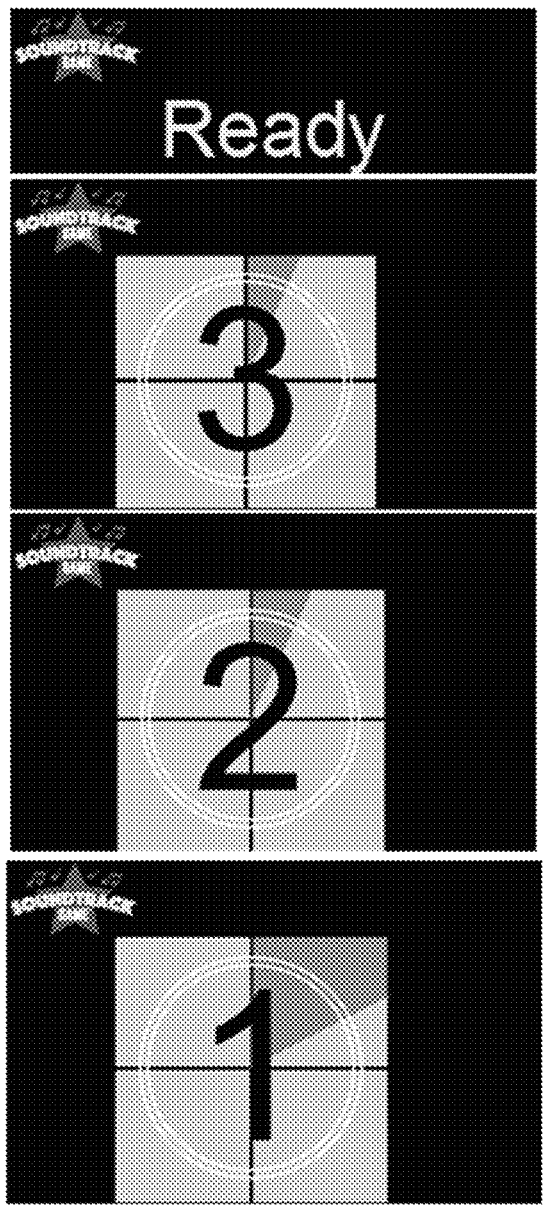
FIGS. 13(a)-(f) illustrate exemplary screen shots displayed on a display in connection with a computer game application using the computer-aided synchronization processing of video with music according to an embodiment of the present disclosure.
Figure 13B:
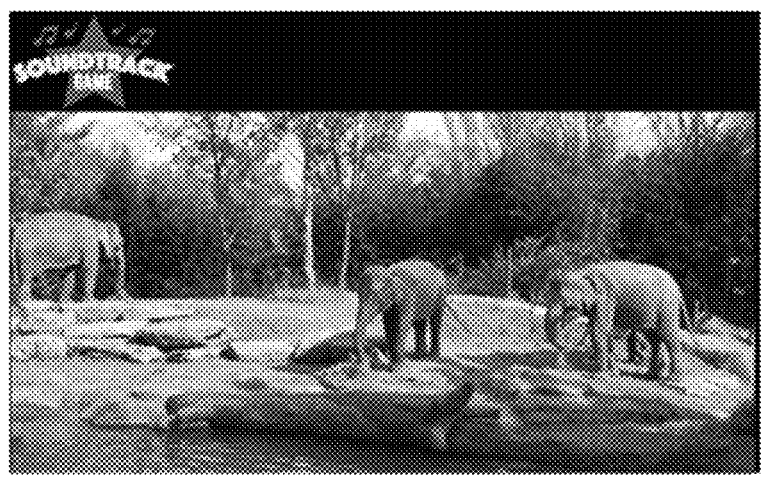

Next, after the playing cards 1105 are dealt to each player, the computer system 100 randomly selects and plays a video stream 200 stored in a video database 110 (the cards may be dealt after the video stream 200 is selected). The server 120 generates video information related to the selected video stream 200 and transmits the video information to the display 1100 to be displayed during gameplay, such as shown in exemplary screen shots FIGS. 13(a)-(f). Namely, FIG. 13(a) shows exemplary screenshots of the Soundtrack Game Application to be displayed on the display 1100 when the game is first started. As shown, the "READY" screenshot is displayed on the display 1100 so that the players can get in a suitable state and be fully prepared to watch the video stream 200. The video stream 200 will begin playing shortly thereafter. For example, as shown in FIG. 13(a), there may be a 3 second countdown displayed on the display 1100 to alert the player(s) when the video stream 200 will being playing on the display 1100. FIG. 13(b) shows an exemplary screenshot of the selected video stream 200 being played on the display 1100. In this example, the Soundtrack Game Application randomly selected a video stream 200 about elephants and the clip will play for approximately 30 seconds. Once the video file/steam 200 has completed, the title of the video or movie (e.g., "A Day at the Zoo") and additional information such as scene information (e.g., "Elephant Scene") may be displayed on the display 1100, while awaiting the song entries (music stream 300) selections from the players, such as shown in exemplary screenshot FIG. 13(c).

After viewing the video stream 200, each player selects a song from one of the physical playing cards 1105 that they have been dealt. The player may select a song that best "matches" the video stream 200 featured. The "match" may be natural (e.g., the soundtrack "fits" naturally to the video), or a total mismatch that creates a hilarious or shocking/surprising pairing result.

If the playing cards 1105 are physical playing cards, then each player will hand their selected playing card 1105 to the player controlling the game (ideally the dealer or judge) so that the selected song may be entered into the computer system 100. Preferably, each player will hand their selected playing card 1105 face down so that the other players and the dealer/judge do not know which song they have selected. The controller player can then scan the QR code on each playing card with a QR code reader. The controller player may utilize the camera input on the user device 105 (smart device or table computer) to scan the QR code on the card (see FIG. 13(b)), which is configured by the gaming application software to communicate the selected song to the server 120 to be synchronized with the video stream 200. Alternatively, the controller player may type each player's selection into a query field for the software application so that each selected song may be synchronized with the video stream 200.

The controller player may enter each player's selected song into game controller software downloaded on a user device. The game controller software may be a software application downloaded to the user device (mobile device such as a smartphone or tablet computer), and is referred to herein as the Soundtrack App (discussed in more detail below). Any user device 105 can be used as the game controller by downloading the Soundtrack App. Alternatively, the game controller may be accessed via the Internet by accessing the Soundtrack Game Application via a web page from the user device.

If the playing cards 1105 are virtual playing cards, then each player will select a song from a list of songs generated by the server 120 and displayed on the GUI of their respective user device 105 using the Soundtrack Game Application. The Soundtrack Game Application will then communicate the selected song to the server 120 so that the music stream 300 associated with the selected song is synchronized with the video stream 200.

Figure 13C:
Figure 13D:
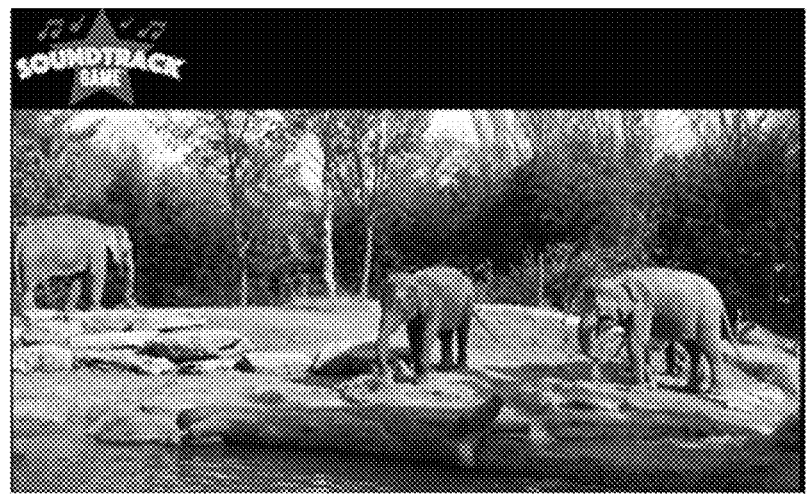

As shown in FIG. 13(c), the server 120 may be configured to identify how many player cards 1105 have been entered (e.g., songs selected) and cause that information to be displayed on the display 1100 so that the dealer/judge will know when to begin playing the synchronized video and music. For example, FIG. 13(c) displays "4 Cards Entered," which means that songs selected from four players have been entered into the Soundtrack Game Application. In this example, since there are only four players, all selections have been entered, and the Soundtrack Game Application will perform the synchronization technique illustrated in FIGS. 9 and 10 for the music stream 300 associated with each selected song, such as shown in exemplary screenshot FIG. 13(d). The same video stream 200 is replayed with the music stream 300 for each selected song. In this example, the same video stream would be played 4 times, each time being synchronized to a different song. The identity of the player who selected the song is preferably anonymous. The order of the song entries may also be randomized so that the players do not know which song was selected by which user. For example, the first player who handed her/his selected playing card 1105 to the controller player may have her/his song played last, and the last player who handed her/his playing card 1105 to the controller player may have her/his song played first.

Figure 13E:
Figure 13F:
Figure 14A:
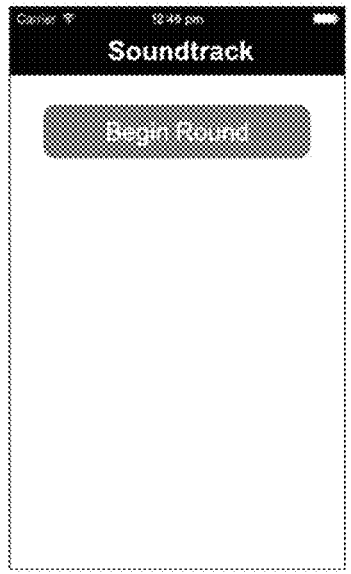
FIGS. 14(a)-(d) show an exemplary graphical user interface (GUI) generated by the server and displayed on a user electronic device in connection with a computer game application using the computer-aided synchronization processing of video with music according to an embodiment of the present disclosure.
Figure 14B:
Figure 14C:
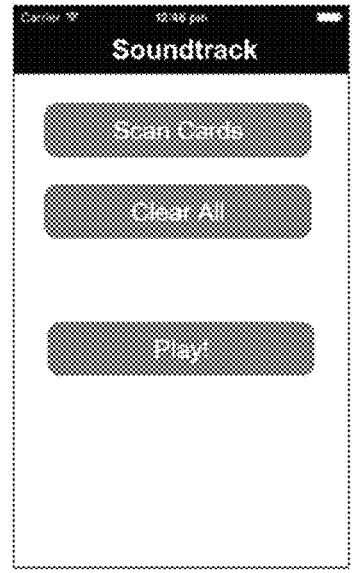
Figure 14D:

After each viewing of the synchronized video and music stream, the music title (e.g., "ODE TO JOY") and other identifying information, such as artist (e.g., "LUDWIG VAN BEETHOVEN"), may be generated by the server 120 and displayed on display 1100 for the players to see, such as shown in exemplary screenshot FIG. 13(e). This is repeated until all song entries have been synchronized using the synchronization technique described in FIGS. 9 and 10, and played with the video stream 200.

Finally, after all players' songs have been played with the video stream 200, the server 120 may be configured to generate a graphical display that lists all of the songs synchronized and played with the video stream, such as shown in FIG. 13(*f*). In this example, the four songs were 1) THE TRUNK DANCE (Zoo House Band), 2) ODE TO JOY (Beethoven), 3) ELEPHANT IN THE ROOM (DJ Zoo Man), and 4) LOVE IS IN THE AIR (Big Land Mammals). The server 120 may also be configured to generate an Internet link on the user device 105 so that the players may purchase the full movie/video associated with the video stream 200 and the full song or music associated with each of the music streams 300, as indicated by the "Buy Now" buttons next to each song shown in FIG. 13(*f*). For example, the "Buy Now" button/option may be displayed, via the display 1100 and/or user device 105, next to the movie/video title, or next to each music title being played, so that by clicking the button/option, the player can instantly purchase the full movie associated with the video stream 200 or full song or music associated with each of the music streams 300.

At this time, the game judge (e.g., one of the players) may select what she/he determines to be the winning synchronized video and music stream. The winning stream is of course subjective and may be whichever the judge determines is the most outrageous, funny, or ideally combined song with the video. After the winner is announced, each player may be presented with another playing card to replace the card that was selected, and the game application may be repeated with a new video stream 200 randomly selected by the server 120.

FIGS. 14(*a*)-(*d*) illustrates an exemplary graphical user interface (GUI) displaying control information for the Soundtrack Game Application (game controller). The illustrated GUI 1400 may be presented on the user device 105, such as a computer, tablet computer, smart phone, or the like. The GUI 1400 may include a control button/option that enables the player controlling the game (e.g., dealer or judge) to start the Soundtrack Game Application. For example, as shown in exemplary FIG. 14(*a*), though GUI 1400 and/or touch screen display, the controller player may start the Soundtrack Game Application by pressing or selecting the "Begin Round" option 1401 presented on the user device 105. The player preferably will not start the Soundtrack Game Application until the playing cards 1105 have been dealt to all of the players.

Next, once the "Begin Round" option has been pressed or selected, the GUI 1400 may include a notification that the video clip/stream 200 is playing. For example, as shown in FIG. 14(*b*), the GUI 1400 displays "Video Clip Currently Playing" so that the controller player knows that the original video stream selected by the server 120 is being played on display 1100.

Next, after the video stream 200 is finished playing, the GUI 1400 and/or touch screen display may include additional control buttons for the controller player. For example, the GUI 1400 may include a control button/option to instruct the user device to scan QR codes (utilizing the camera input on the user device or a QR reader) provided on the playing cards 1105 so that the music stream 300 associated with each selected playing card 1105 will be synchronized with the video stream 200. This is shown as the "Scan Cards" button 1402 in exemplary screenshot 14(*c*). The GUI 1400 may also be configured to include a fillable entry option (not shown) so that the controller player may enter manually each player's selected song when the playing cards 1105 do not have QR codes or bar codes, so that the music stream 300 associated with each selected playing card 1105 will be synchronized with the video stream 200.

The GUI 1400 may also include an indicator identifying how many playing cards 1105 have been entered (not shown) so that the controller player knows whether all player selections have been entered. The GUI 1400 may be configured to provide audio, visual, or haptic feedback to the player controlling the game when the QR code for each playing card 1105 is successfully scanned.

The GUI 1400 may also include a complete button/option for the controller player to instruct the server 120 to perform the synchronization technique illustrated in FIGS. 9 and 10 for the music stream 300 associated with each selected song. For example, as shown in FIG. 14(*c*), the GUI 1400 includes a control button/option, such as "Play!" button 1403, which instructs the server 120 to perform the synchronization technique illustrated in FIGS. 9 and 10. Then, as described above, the Soundtrack Game Application will randomly play the video stream 200 synchronized with each players' selected song, such as shown in FIGS. 12(*d*) and (*e*). When all of the synchronized video/music streams have been played, the GUI 1400 may identify that the round is complete, and include a new control button/option for the controller player to instruct the server 120 to being a new round of the game. This is shown in exemplary screenshot FIG. 14(*d*), which illustrates the "Begin Next Round" button 1404 for the player controlling the game to select. In other words, once the game judge determines the winning synchronized video/music stream, another round of the game may begin with each player being presented with another playing card to replace the card that was selected in the previous round.

FIGS. 15(A)-(B) is a flowchart of an exemplary method for playing the Soundtrack Game Application discussed above with respect to FIGS. 11-14. At step S1500, at least one video stream 200 (preferably many) is entered into the server 120. At step S1505, each video stream 200 entered into the server 120 is processed according to the video processing technique described in FIGS. 2-6, and each processed video stream 200 is stored in video database 112. At step S1510, at least one music stream 300 (preferably many) is entered into the server 120. At step S1515, each music stream 300 entered into the server 120 is processed according to the video processing technique described in FIGS. 7 and 8, and each processed music stream 300 is stored in video database 115.

At step S1520, each player may be dealt playing cards 1105 (physical cards with QR codes on the back, or virtual cards displayed on their user device (e.g., a tablet, smart phone or laptop online game version). For example, each player may be dealt five (5) playing cards 1105 at random. Each playing card 1105 contains a song name associated with a music stream 300 stored in the music database 115. The music stream 300 may be a clip from a song/soundtrack piece (e.g., the music ranges from Classical, to Rock, Rap, R&B, Heavy Metal, Jazz, Big Band, etc.). Each playing card 1105 may also contain a brief description of the associated song (e.g., Artist, Name of the song, a few lyrics, and possibly a phrase describing the piece and its best usage with film).

At step S1525, the server 120 is configured to randomly select and play a video stream 200 from the video database 112, and display the video on display 1100, such as illustrated in FIGS. 12(*a*) and (*b*). The video streams 200 may be organized and identified by categories, such as Action, Romance, Classics, Comedy, Fights, SF, Sports, etc. Accordingly, the server 120 may be configured so that no more than two video streams 200 from the same category are consecutively selected when the selection is in random mode.

Alternatively, the server may be configured so that all video streams 200 are randomly selected from a single category (e.g., all Sports) It is understood that the "random" selection option may be turned off so that the server is configured to select an exact video stream 200 that the player wants to have undergo the synchronization technique described in FIGS. 9 and 10.

At step S1530, after viewing the displayed video stream 200, each player selects one song (music stream 300) from their dealt hand of playing cards 1105 to be synchronized with the displayed video stream 200. At step S1535, each player's selection is entered into the Soundtrack Game Application software to be processed, such as shown in FIG. 12(c). At step S1540, after each player's selection is entered, the synchronization technique described in FIGS. 9 and 10 is performed, and the server 120 starts randomly playing the synchronized video/music streams on display 1100, such as shown in FIGS. 12(d) and (e). Finally, at step S1445, after all of the players' synchronized video/music streams have been played on display 1100, a game judge will determine the winner, such as shown in FIG. 12(f). Judging is subjective, and winning is secondary to the fun of playing.

Once the game judge determines the winner, another round of the game may begin with each player being dealt another playing card to replace the card that was used in the previous round and steps S1520-S1545 are repeated. The full song associated with the winning synchronized video/music stream may be played by the display 1100 while the replacement cards are dealt and the players get ready for the next round of play. Preferably, the players will take turn being the judge, with the judge sitting out for that round.

Figure 16A:
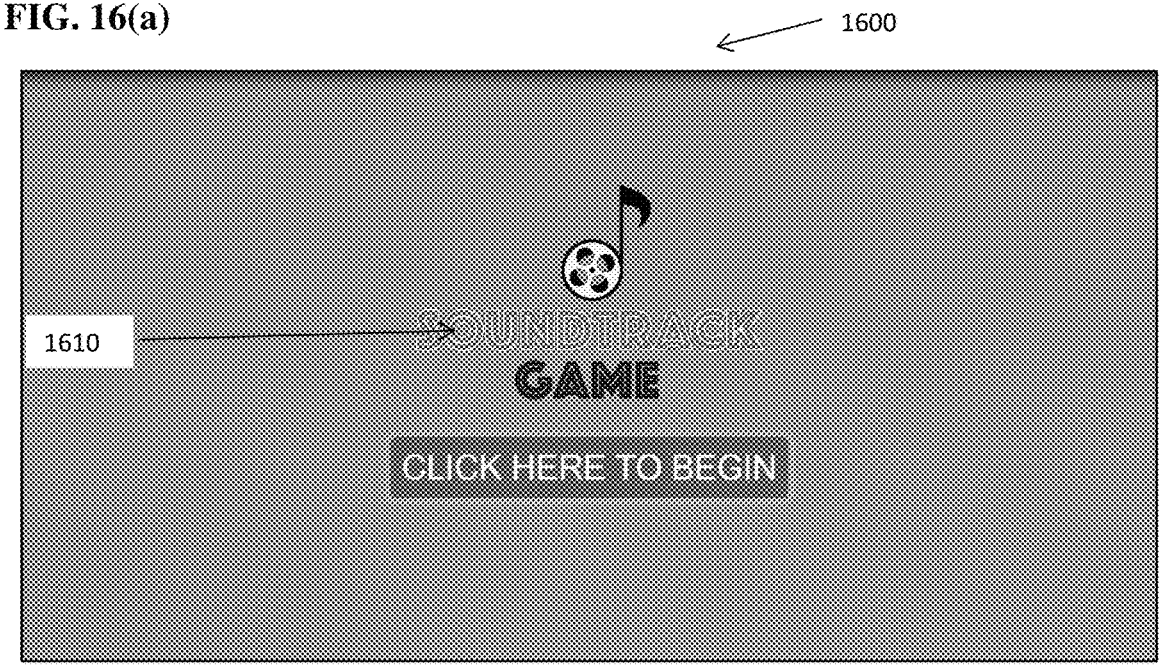
FIGS. 16(a)-(o) illustrate exemplary screenshots of graphical user interfaces generated by the server using virtual playing cards in accordance with a computer game application using the computer-aided synchronization processing of video with music according to an embodiment of the present disclosure.
Figure 16B:
Figure 16C:
Figure 16D:
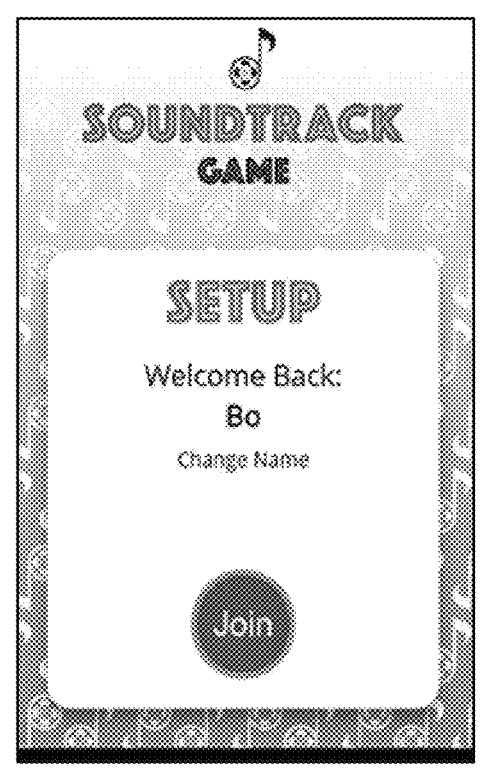
Figure 16G:
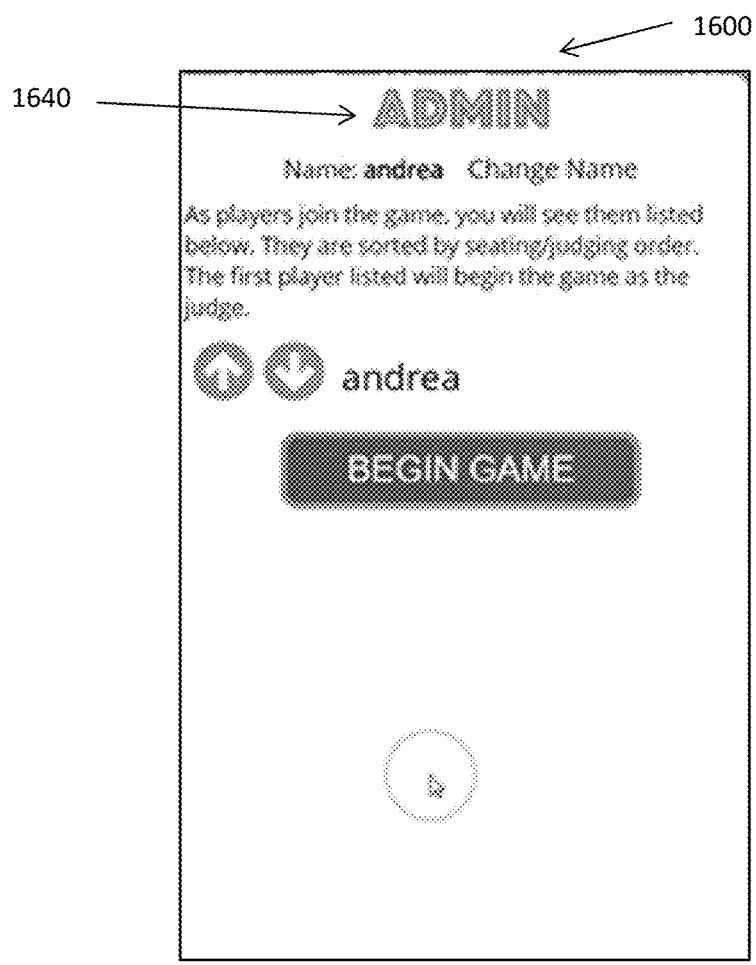
Figure 16H:
Figure 16I:
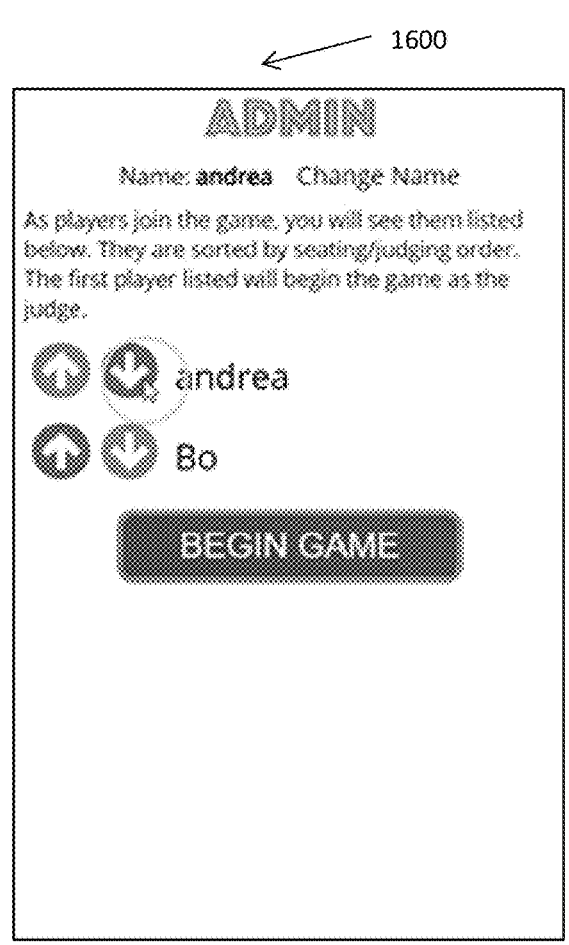
Figure 16J:
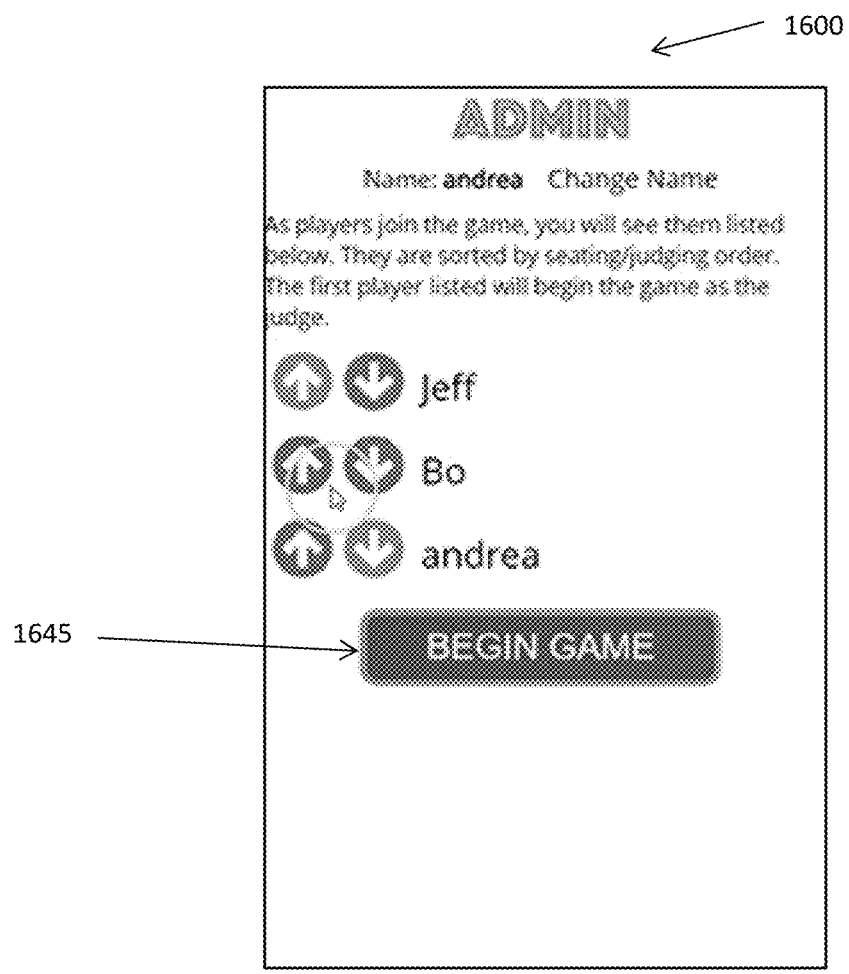
Figure 16K:
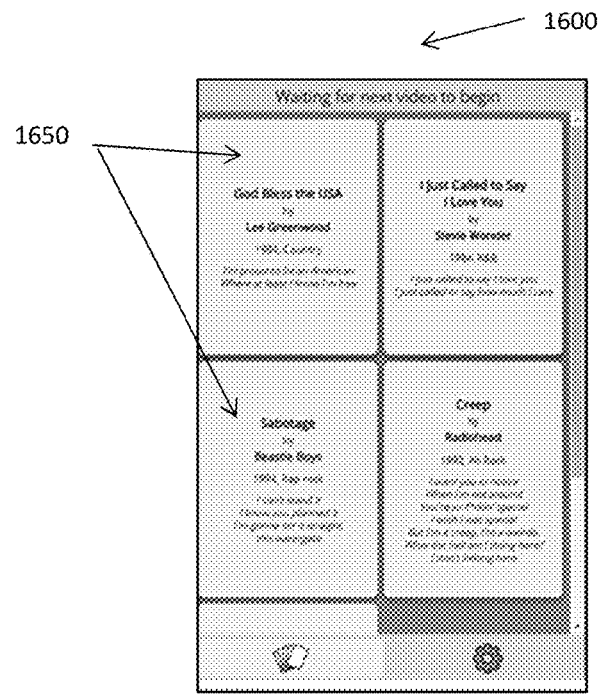
Figure 16L:
Figure 16M:
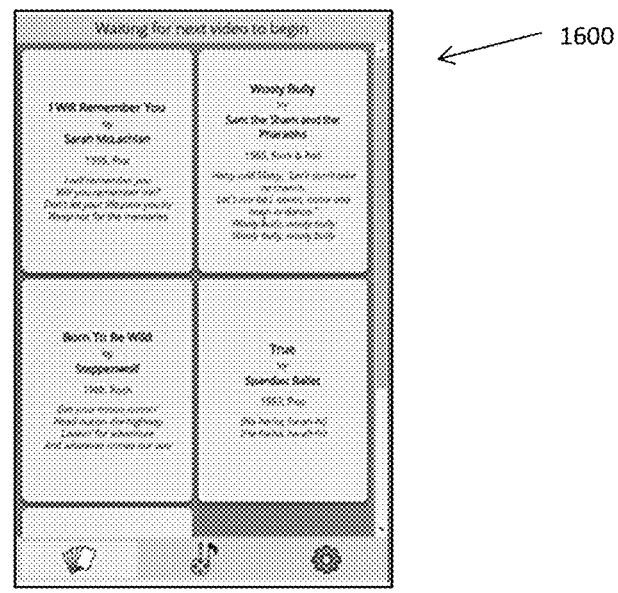
Figure 16N:
Figure 16O:
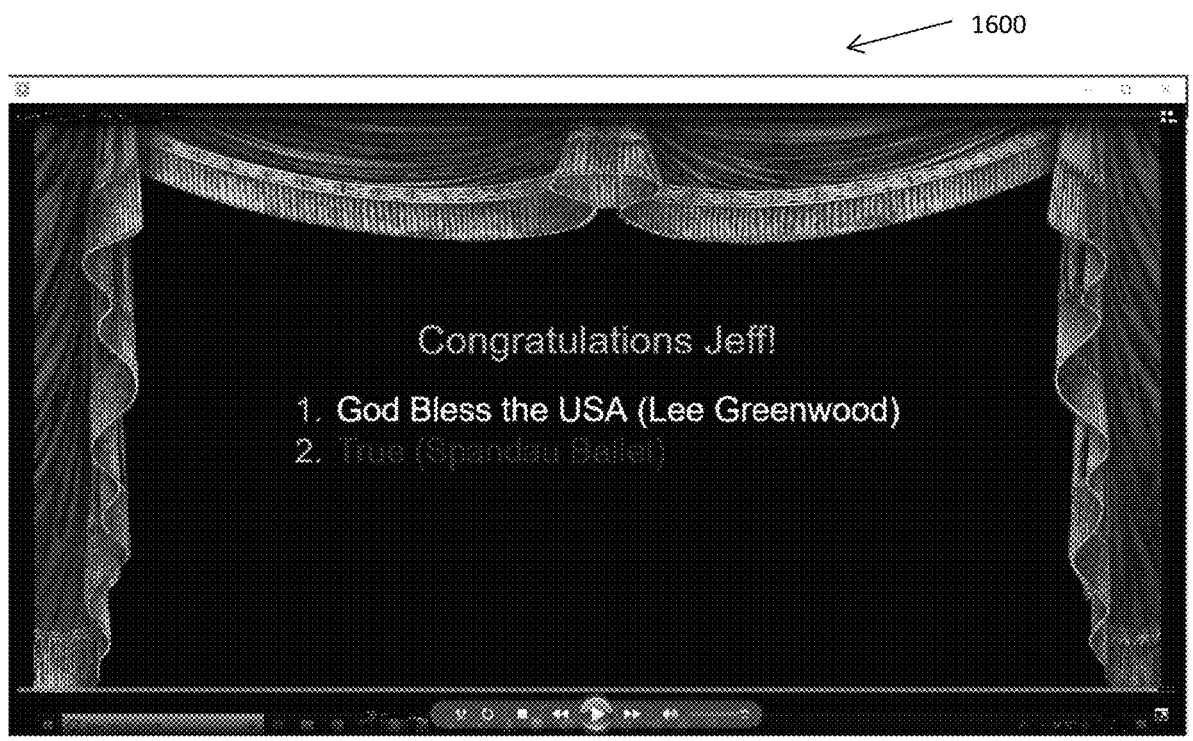

Next, FIGS. 16(a)-(o) are screenshots showing exemplary graphical user interfaces 1600 generated by the server 120 when the playing cards are virtual playing cards in accordance with the foregoing embodiments.

FIG. 16(a) shows an exemplary GUI 1600 generated by the server 120 that may be displayed on the controller player's end user device 105 and/or display 1100 when the game application is first started. What is displayed on the mobile device may be simultaneously and identically displayed on display 1100, such as a laptop computer display or television. This way, all players wishing to participate in the Soundtrack Game Application can see the image. The GUI may include a "CLICK HERE TO BEGIN" button 1610 that the controller player can press or touch to direct the server 120 to begin the Soundtrack Game Application.

Next, as shown in exemplary FIG. 16(b), the server 120 may generate a QR code 1615 linked to the Soundtrack Game Application. The QR code 1615 may be displayed on the controller player's end user device 105 and/or display 1100. Each player may each join the game by scanning the QR code with their mobile devices. The QR code is linked to a game website address (e.g., https://soundtrackgame.com/sg/4/#/game/bo2) that contains the game application. When scanned, the game application may automatically open in a web browser on the end user device 105. A URL 1620 linked to the game application may also be displayed. A player with an end user device that is unable to scan the QR code may join the Soundtrack Game Application by manually entering the URL in their web browser. The server 120 may be configured to tabulate and display in real time how many players have joined the game. For example, FIG. 16(b) shows "Players Joined: 0" 1625—therefore, at the time this screenshot was taken, no player had scanned the QR code 1615 or entered the URL 1620. If one player had done so, the display would have read "Players Joined: 1," if two players had done so, the display would have read "Players Joined: 2," and so on.

Next, the server 120 may generate a GUI to be displayed on the end user device 105 of each player that joined the game. For example, FIG. 16(c) shows a GUI having a setup configuration that is displayed on player Jeff's end user device 105 because player Jeff joined the game. Similarly, FIG. 16(d) shows a GUI having a setup configuration that is displayed on player Bo's end user device 105 because player Bo joined the game. Here, because the server 120 recognized that Jeff and Bo previously played the Soundtrack Game Application on their respective user devices 105, the server generates a welcome image that welcomes back both players. As shown in FIGS. 16(c) and (d), the setup configuration for players Jeff and Bo may be configured to allow them to change their name so that the changed name will be displayed instead. FIG. 16(e) shows a GUI having a setup configuration that is displayed on a player's end user device 105 who is not recognized by the server 120 as having played the Soundtrack Game Application before. In this example, the player may type his or her into a fillable name entry field 1630, as shown in FIG. 16(f). Here, the player is Andrea. The GUI may include a "Join" button 1635 that each player can press or touch to direct the server 120 to join them in the game.

The server 120 may be configure to recognize the first player to join the Soundtrack Game Application as the game administrator (may be the controller or another player). The game administrator perform tasks such as setting the seating order for the players, beginning the next round of game play, begin playback, etc. For example, as shown in FIG. 16(g), the server 120 recognized Andrea as being the first player to join the game; therefore, Andrea was tasked as the game administrator. Accordingly, an administrator page 1640 ("ADMIN") is displayed on her end user device 105. The administrator page 1640 may include administrator related controls and options that are not displayed on the non-administrator player end user devices 105 or available to those players. Exemplary embodiments of the administrator page 1640 are shown in FIGS. 16(h)-(l) and discussed in more detail below.

FIG. 16(g) is a screenshot of the administrator page 1640 as it appears before the other players Jeff and Bo join the game. FIG. 16(h) is a screenshot of the administrator page 1640 when the server 120 initially recognizes that player Bo has joined the game. As players join the game, they will be listed on the administrator page 1640. The administrator has the option to rearrange the seating order of the players, such as shown in FIGS. 16(h) and (i). In FIG. 16(h), the seating order is Bo and then Andrea. In FIG. 16(i), the seating order is Andrea and then Bo. Here, Andrea switched the order by pressing or clicking on the up and down arrows located next to each player's name on the administrator page 1640 (not limited thereto). Jeff's name does not appear on the administrator page 1640 because he has not yet joined the game. Once Jeff joins the game, his name will appear on the administrator page 1640, such as shown in FIG. 16(j). The seating order is simply the judging order of the players. The first player listed will be the judge for the first round of the game, the second player listed will be the judge for the second round of the game, and so on.

The administrator page 1640 may include a "BEGIN GAME" button 1645 that the administrator can press or touch to direct the server 120 to begin the Soundtrack Game Application once all of the players have joined the game. The server 120 may then randomly select a video clip/stream 200 from the video database 112 and then play the video clip/stream 200 on display 1100 or end user device 105, such as discussed above. This video clip/stream 200 is known as a preview video. The preview video is one that has not been synchronized with music from the music database 115.

The server 120 may generate virtual playing cards 1650 and display them on each end user device 105, such as shown in exemplary screenshots FIGS. 16(*k*)-(*m*). The virtual playing cards 1650 may be generated and displayed before, during, or after the preview video is shown.

More particularly, the server 120 may be configured to randomly select from a database at least one virtual playing card 1650 and display the selected virtual playing card 1650 on each end user device 105. Each virtual playing card 1650 is associated with a music clip/stream 300 from the music database 115, and may include a name of the song and/or other information related thereto. Each virtual playing card 1650 may comprise a button or tile displayed on the GUI of the end user devices 105.

Looking at FIG. 16(*k*), which is a screenshot of Jeff's end user device 105, the server randomly selected and displayed several virtual playing cards 1650, including for example, "GOD BLESS THE USA" by Lee Greenwood; "I JUST CALLED TO SAY I LOVE YOU" by Stevie Wonder; "SABOTAGE" by Beastie Boys; and "CREEP" by Radiohead. Jeff may select one of the displayed songs by pressing or touching the virtual playing card 1650.

Looking at FIG. 16(*l*), which is a screenshot of Bo's end user device 105, the server randomly selected and displayed several virtual playing cards 1650, including for example, "GIRL FROM IPANEMA," "DON'T WORRY BE HAPPY" by Bobby McFerrin, "GET READY FOR THIS" by 2 Unlimited, and "MAD WORLD" by Gary Jules. Bo may select one of the displayed songs by pressing or touching the virtual playing card 1650. Looking at FIG. 16(*m*), which is a screenshot of Andrea's end user device 105, the server randomly selected and displayed several virtual playing cards 1650, including for example, "I WILL REMEMBER YOU" by Sarah McLachlan, "WOLLY BULLY" by Sam the Sham and the Pharohs, "BORN TO BE WILD" by Steppenwolf, and "TRUE" by Spandau Ballet. Andrea may select one of the displayed songs by pressing or touching the virtual playing card 1650.

Once all of the players have selected their respective song to be played with the preview video, the administrator page 1640 may inform the administrator that all music selections are in and/or alert the administrator to take an action. The alert may be visual, audio, or haptic. The action to be taken may be to "Begin Playback" so that the server 120 starts randomly playing the synchronized video/music streams on display 1100 and/or the end user devices 105 according to the synchronization technique disclosed herein. The action may be to start another round of game play. When the next round begins, the server 120 may randomly select and play another preview video, and randomly select and deal one or more virtual playing cards 1650 to each end user device 105. For each round, the server 120 may be configured to deal a single new virtual playing card 1650 to each of the end user devices 105 that will replace the cards selected by the players in the previous round, or deal an entire new set of virtual playing cards 1650 to each of the end user devices 105.

The judge is provided with additional judge control options that are not available to the non-judge players. For example, once all of the synchronized video/music streams have been played for a given round, the server 120 may generate a prompt on the GUI to be displayed on the judge's end user device 105, such as shown in exemplary FIG. 16(*n*). As shown in FIG. 16(*o*), the prompt may list the names of the songs that were played in the round and require the judge to select the winning song by pressing or clicking on a button associated therewith. Once the judge selects a winner, the server may cause the winning song and/or the name of the winning player to be displayed on the display 1100 and/or end user devices 105, such as shown in exemplary screenshot FIG. 16(*o*). In this example, the winning song was "GOD BLESS THE USA" selected by winning player Jeff.

The server 120 may be configured to generate and display a standings page. The standings page may rank the players by order of winning selections. In this example, after round one, the standings would reflect Jeff 1, Andrea 0, and Bo 0. The standings page 1655 may be displayed after each round of play, or at any other time. The standings page 1655 may be also be displayed on the end user devices 105.

Further, the server 120 may be configured to allow two players to participate on a single team, which each player using a separate end user device 105. Here, the server 120 will generate a QR code and/or URL that the second (additional) player can enter to cause a mirror account to be created on the second player's end user device 105. This option may also be useful if a player's end user device battery is running low and the player wants to connect to a second end user device and not be disconnected from the game.

Exemplary Game Points and Winning Strategies for the Soundtrack Game Application:

The following are exemplary game points and winning strategies for the Soundtrack Game Application described above.

A player may earn 1 point for being the first to guess the original movie associated with the randomly selected video stream. Of course, in this example, the title of the movie or video would not be displayed when the video stream is played on the display 1100 (exemplary FIG. 13(*c*) shows the video material title).

A player may earn 1 point for matching the winning song with the video stream as deter-mined by the judge. The intended matches sought by the player participants may be categorized as:

1. Music style/song to "fit" naturally to the video stream 200 (e.g., almost as "intended" by the original movie/video clip producer);
2. Music lyrics match (or totally "mock") the video stream 200;
3. Music title "fits" the video stream 200; and
4. Timing of the song's climax moment (beat, chorus, etc.) "fits" almost flawlessly with the video stream 200 climax key moment (explosion, shot, psychological moment, hit, fall, etc.)

Of course, a good strategy is for the player to know the Judge's preferences and then to select a music stream 300 accordingly.

Exemplary Online and Offline Versions of the Soundtrack Game Application:

It is understood that the exemplary Soundtrack Game Application described herein may be configured as an online version, an offline version, or a hybrid version. In one embodiment, the online version may employ a terminal device (e.g., smart phone, tablet, laptop computer, smart TV, etc.) to play the Soundtrack Game Application. The players can be located in the same room, scattered throughout the world, or a combination thereof. After signing into the same game, the randomly selected video stream 200 is simultaneously played on each player's respective user device 105.

Then, each player clicks on their desired virtual playing card 1105 (e.g., from a selection of 5 virtual playing cards) that is included on the GUI displayed on the display screen of their user device 105. Once all of the players have selected their virtual playing card 1105, the synchronization technique described in FIGS. 9 and 10 is performed, and each of the synchronized video/music streams is displayed on at a time on each player's respective user device 105.

B. Soundtrack ("STrack") Wiz App

According to another exemplary embodiment of an website application using the computer-aided synchronization processing of video with music described above in FIGS. 1-10, a user may add a soundtrack to a video, such as a short home video taken with the user's smartphone device. For example, this application—which is referred to herein as the Soundtrack Wiz App or STrack Wiz App—utilizes the video database 110 and/or music database 115 stored in memory 124 and the video streams 200 and/or music streams 300 processed via processor 122 of server 120 using the synchronization technique described in FIGS. 2-10. This application allows the user to test and select a favorite soundtrack for their home video clip.

For example, the user may upload his/her home video clip into the Soundtrack Wiz app. The home video clip may then be instantly processed in a similar manner as described above for the Soundtrack Game Application ("Movie Clip processing"), as illustrated in FIG. 1-6. The home video clip can be synchronized with any music stream 300 from the Soundtrack Wiz music database 115. Each music stream 300 selected by the user is synchronized in real time with the home video clip using the synchronization technique described herein. The music database 115 can contain thousands (or more) of music streams 300 for the user to choose from. This allows the user to rapidly "test" any music stream 300 in order to find his or her favorite home video clip soundtrack.

It is understood that various embodiments of the present disclosure may be implemented in a data processing system suitable for storing and/or executing program code that includes at least one processor, including a multicore processor, coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the computer system either directly or through intervening I/O controllers. Network adapters may also be coupled to the computer system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language, "R" programming language or similar programming languages. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Features or functionality described with respect to certain example embodiments may be combined and sub-combined in and/or with various other example embodiments. Also, different aspects and/or elements of example embodiments, as disclosed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer system comprising:
a server comprising a processor and a memory, the memory comprising a video database and a music database, the video database configured to store a plurality of video files, each of the video files comprising a plurality of video file markers, and the music database configured to store a plurality of music files, the plurality of music files each comprising a plurality of music file markers,
wherein the server is configured to:
synchronize a music file from the plurality of music files with one of the plurality of video files by aligning the video file markers of the video file with the music file markers for the music file to produce a synchronized video-music tile; and
transmit the synchronized video-music file to a display to be displayed,
wherein the video file markers are generated by the processor for each of the video files stored in the video database and the music file markers are generated by the processor for each of the music tiles stored in the music database,
wherein the video file comprises at least a portion of a movie, a video, or a graphical offering,
wherein the music file comprises at least a portion of a song or an audio offering,
wherein the video file comprises at least one music start time marker that identifies a time point at which the music file will begin playing during playback of the synchronized video-music file, each music start time marker having a priority component and a time component assigned thereto relative to a video timeline of the video file; and
wherein the video file comprises at least one video key frame moment that identifies a key video portion of the video file, each video key frame moment, having a priority component and a time component assigned thereto relative to the video timeline,
wherein the video file markers comprise:
a video file start time marker in the video file that identifies a time point at which the video file will begin playing during playback of the synchronized video-music tile;
a video file end time marker in the video file that identifies a time point at which the video file ends during playback of the synchronized video-music file;
a video file volume envelope in the video file that controls audio volume of the video file is adjusted during playback of the synchronized video-music file; and
a music volume envelope in the video file that controls music volume of the retrieved music file to be synchronized with the video file, and
wherein the music file markers comprise:
at least one music start time marker in the music file that identifies a time point at which the music file will begin playing during playback of the synchronized video-music file, each music time start marker having a priority component and a time component assigned thereto relative to a music timeline of the music file; and
at least one music key sound moment in the music file that identifies a key sound portion of the music file, each music key sound moment having a priority component and a time component assigned thereto relative to the music timeline.

2. The computer system of claim 1, wherein during the synchronization process, to determine an optimal alignment of the video file markers and the music file markers, the server is configured to:
- determine whether any combination of the at least one video start time marker and the at least one music start time marker results in an alignment of any of the at least one video key frame moment with any of the at least one music key sound moment within a predetermined threshold of time of the video timeline; and
- pair any of the video start time markers and the music start time markers that are determined to be in alignment,
- whereby when more than one pair of the video start time markers and the music start time markers are determined to be in alignment, then the pair with the highest priority is determined to be the video start time marker and the music start time marker used in the synchronized video-music file,
- whereby when more than one pair of the video start time markers and the music start time markers are determined to share the highest priority, then the pair with the smallest time component is determined to be the video start time marker and the music start time marker used in the synchronized video-music file.

3. The computer system of claim 2, wherein the server is configured to detect audio changes in the music file in order to generate the at least one music key sound moment, whereby such detection is determined by parameterizing the music file and then evaluating the parameterized music file to detect changes from frame to frame.

4. The computer system of claim 2, wherein the predetermined threshold of time is 0.10 seconds.

5. A method comprising:
- synchronizing, by a server, music file comprising a plurality of music file markers with a video file comprising a plurality of video file markers by aligning the video file markers with the music file markers to produce a synchronized video-music file; and
- transmitting, by the server, the synchronized video-music file to a display to be displayed,
- wherein the server comprises a processor and a memory, the memory comprising a video database and a music database, the video database configured to store the video file and the music database configured to store the music file,
- wherein the video file markers and the music file markers are generated by the processor,
- wherein the video file comprises at least a portion of a movie, a video, or a graphical offering,
- wherein the music file comprises at least a portion of a song or an audio offering,
- wherein the video file comprises at least one music start time marker that identifies a time point at which the music file will begin playing during playback of the synchronized video-music file, each music start time marker having a priority component and a time component assigned thereto relative to a video timeline of the video file; and
- wherein the video file comprises at least one video key frame moment that identifies a key video portion of the video file, each video key frame moment having a priority component and a time component assigned thereto relative to the video timeline,
- wherein the video file markers comprise:
- a video file start time marker in the video file that identifies a time point at which the video file will begin playing during playback of the synchronized video-music file;
- a video file end time marker in the video file that identifies a time point at which the video file ends during playback of the synchronized video-music file;
- a video file volume envelope in the video file that controls audio volume of the video file is adjusted during playback of the synchronized video-music file; and
- a music volume envelope in the video file that controls music volume of the retrieved music file to be synchronized with the video file, and
- wherein the music file markers comprise:
- at least one music start time marker in the music file that identifies a time point at which the music file will begin playing during playback of the synchronized video-music file, each music time start marker having a priority component and a time component assigned thereto relative to a music timeline of the music file; and
- at least one music key sound moment in the music file that identifies a key sound portion of the music file, each music key sound moment having a priority component and a time component assigned thereto relative to the music timeline.

6. The method of claim 5, wherein during the synchronization process, to determine an optimal alignment of the video file markers and the music file markers, the server is configured to:
- determine whether any combination of the at least one video start time marker and the at least one music start time marker results in an alignment of any of the at least one video key frame moment with any of the at least one music key sound moment within a predetermined threshold of time of the video timeline; and
- pair any of the video start time markers and the music start time markers that, are determined to be ire alignment,
- whereby when more than one pair of the video start time markers and the music start time markers are determined to be in alignment, then the pair with the highest priority is determined to be the video start time marker and the music start time marker used in the synchronized video-music file,
- whereby when more than one pair of the video start time markers and the music start time markers are determined to share the highest priority, then the pair with the smallest time component is determined to be the video start time marker and the music start time marker used in the synchronized video-music file.

* * * * *